(12) United States Patent
Tsuchikawa et al.

(10) Patent No.: US 11,524,228 B2
(45) Date of Patent: Dec. 13, 2022

(54) SORTING COMPUTER APPLICATIONS OR COMPUTER FILES AND INDICATING A SORT ATTRIBUTE IN A USER INTERFACE

(71) Applicant: SONY INTERACTIVE ENTERTAINMENT INC., Tokyo (JP)

(72) Inventors: Yuji Tsuchikawa, San Francisco, CA (US); Ryan D. Sutton, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 247 days.

(21) Appl. No.: 16/870,810

(22) Filed: May 8, 2020

(65) Prior Publication Data

US 2021/0346797 A1 Nov. 11, 2021

(51) Int. Cl.
*A63F 13/00* (2014.01)
*A63F 13/25* (2014.01)
*A63F 13/48* (2014.01)
*G06F 3/04817* (2022.01)

(52) U.S. Cl.
CPC .............. *A63F 13/25* (2014.09); *A63F 13/48* (2014.09); *G06F 3/04817* (2013.01); *A63F 2300/308* (2013.01); *A63F 2300/5526* (2013.01)

(58) Field of Classification Search
None
See application file for complete search history.

(56) References Cited

U.S. PATENT DOCUMENTS

| | | | |
|---|---|---|---|
| 5,497,455 A * | 3/1996 | Suga ..................... | G06F 3/0482 715/810 |
| 6,101,506 A | 8/2000 | Ukai et al. | |
| 7,770,125 B1 | 8/2010 | Young et al. | |
| D761,842 S * | 7/2016 | Johnson ........................ | D14/488 |
| 9,519,471 B2 | 12/2016 | Machalani et al. | |

(Continued)

FOREIGN PATENT DOCUMENTS

| | | |
|---|---|---|
| EP | 2713260 A1 | 4/2014 |
| WO | 2014130321 A2 | 8/2014 |
| WO | 2015066658 A1 | 5/2015 |

OTHER PUBLICATIONS

PCT/US2021/030333, "International Search Report and Written Opinion", dated Aug. 4, 2021, 11 pages.

(Continued)

*Primary Examiner* — Paul A D'Agostino
(74) *Attorney, Agent, or Firm* — Kilpatrick Townsend & Stockton LLP

(57) ABSTRACT

Techniques are described for an intuitive and efficient GUI. In an example, a UI elements are presented on a GUI. Each one of the UI elements can corresponds to a set of computer applications or a set of computer files having attributes and each one of the UI elements can be selected to launch, as applicable, a computer application, a computer file, or a page about the computer application or computer file. A request to sort the UI elements can be received and can indicate at least one of the attributes as a sort factor. The UI elements are sorted accordingly and presented in an updated arrangement on the GUI. An attribute used in the sorting is presented within or in proximity to the UI elements, whereas another attribute not used in the sorting is not presented in the updated arrangement.

20 Claims, 14 Drawing Sheets

(56) References Cited

U.S. PATENT DOCUMENTS

| | | | |
|---|---|---|---|
| 9,640,138 B2 | 5/2017 | Yasuda et al. | |
| 9,819,997 B2 | 11/2017 | Seo et al. | |
| 10,387,940 B2* | 8/2019 | Akkiraju | G06Q 30/0631 |
| 10,628,870 B2* | 4/2020 | Akkiraju | G06Q 30/0631 |
| 11,003,312 B2* | 5/2021 | Sakaino | G06F 3/0482 |
| 11,095,946 B2 | 8/2021 | Domm et al. | |
| 11,169,665 B2* | 11/2021 | Hunter | G06F 3/04817 |
| 2003/0181242 A1 | 9/2003 | Lee et al. | |
| 2006/0218499 A1 | 9/2006 | Matthews et al. | |
| 2007/0067798 A1 | 3/2007 | Wroblewski | |
| 2007/0112852 A1 | 5/2007 | Sorvari et al. | |
| 2008/0034381 A1 | 2/2008 | Jalon et al. | |
| 2009/0019398 A1 | 1/2009 | Hansson et al. | |
| 2010/0313156 A1 | 12/2010 | Louch et al. | |
| 2011/0032250 A1 | 2/2011 | Tanaka et al. | |
| 2011/0252361 A1 | 10/2011 | Tsuda et al. | |
| 2012/0204131 A1 | 8/2012 | Hoang et al. | |
| 2012/0284673 A1 | 11/2012 | Lamb et al. | |
| 2013/0036380 A1 | 2/2013 | Symons | |
| 2013/0038637 A1 | 2/2013 | Yamanaka et al. | |
| 2013/0055162 A1 | 2/2013 | Arriola et al. | |
| 2013/0067393 A1 | 3/2013 | Demopoulos et al. | |
| 2013/0290886 A1 | 10/2013 | Chen et al. | |
| 2014/0096083 A1 | 4/2014 | Kim et al. | |
| 2015/0128042 A1 | 5/2015 | Churchill et al. | |
| 2015/0169699 A1 | 6/2015 | Gilbert et al. | |
| 2015/0189390 A1 | 7/2015 | Sirpal et al. | |
| 2015/0222700 A1 | 8/2015 | Kay et al. | |
| 2015/0309691 A1 | 10/2015 | Seo et al. | |
| 2015/0370456 A1* | 12/2015 | Kobayashi | A63F 13/23 463/32 |
| 2016/0041719 A1 | 2/2016 | Wang et al. | |
| 2016/0209993 A1 | 7/2016 | Singal et al. | |
| 2016/0224211 A1 | 8/2016 | Xu et al. | |
| 2017/0060388 A1* | 3/2017 | Einaudi | G06F 3/167 |
| 2017/0091336 A1 | 3/2017 | Royzner et al. | |
| 2017/0153792 A1 | 6/2017 | Kapoor et al. | |
| 2017/0323279 A1* | 11/2017 | Dion | G07F 17/3216 |
| 2018/0025315 A1* | 1/2018 | Cortes | G06Q 10/087 705/26.81 |
| 2018/0091865 A1* | 3/2018 | Pearlman | H04N 21/4532 |
| 2018/0107146 A1* | 4/2018 | Shinohara | G03G 15/6552 |
| 2018/0342328 A1* | 11/2018 | Chan | G06F 16/951 |
| 2018/0348978 A1* | 12/2018 | Audet | G06F 3/0482 |
| 2018/0371545 A1* | 12/2018 | Wong | G16B 45/00 |
| 2019/0370282 A1 | 12/2019 | Vergnaud et al. | |
| 2020/0081592 A1 | 3/2020 | Lin et al. | |
| 2021/0011609 A1 | 1/2021 | Zhang | |
| 2021/0349586 A1 | 11/2021 | Tsuchikawa et al. | |

OTHER PUBLICATIONS

PCT/US2021/030336, "International Search Report and the Written Opinion", dated Aug. 11, 2021, 15 pages.

PCT/US2021/030339, "International Search Report and Written Opinion", dated Aug. 4, 2021, 11 pages.

* cited by examiner

Default Sort 810
- New
- Update
- Played
- Purchased
- Available

File Size Sort 820
- File Size

Alphabetical Sort 830
- Ascending
- Descending

Hours Played Sort 840
- Number of hours

Purchased Date Sort 850
- Purchase Date
- Available Data

Generation Sort 860
- Generation A
- Generation B

Version Sort 870
- Beta
- Trial
- Demo
- Full

SORTING COMPUTER APPLICATIONS OR COMPUTER FILES AND INDICATING A SORT ATTRIBUTE IN A USER INTERFACE

BACKGROUND OF THE INVENTION

Graphical user interfaces (GUIs) are the predominant type of interfaces available to users for interacting with computer systems. A GUI includes selectable icons to launch applications or open files on a computer system. Typically, to launch a specific application or open a file, a file browser or a menu is presented in the GUI and includes icons corresponding to the applications or files such that a user selection for a particular icon is received. In certain situations, the computer system stores a large number of applications or files and, possibly, multiple variations per application or file. Accordingly, a large number of icons would be presented on the GUI.

To illustrate, consider an example of a GUI of a video game system hosting multiple variations of a same video game application (e.g., a demo version, a trial version, a beta version, and a full version). The GUI presents a menu that includes video game icons. These icons include a first icon for the demo version, a second icon for the trial version, a third icon for the beta version, and a fourth icon for fourth version. Accordingly, for the same video game application, four icons are presented in this illustrative example. To launch one of the video game application (or a specific variation), a user needs to navigate through the many icons presented to select the corresponding icon.

Hence, although a GUI can be an effective user interface, the large number of applications, files, and/or variations thereof may render the usability of the GUI to become less intuitive and efficient. There is a need for an improved GUI that is more intuitive and efficient.

BRIEF SUMMARY OF THE INVENTION

Embodiments of the present disclosure relate to techniques for a more intuitive and efficient GUI. In an example, a method for sorting elements on a user interface is implemented on a computer device. The method includes presenting, on the user interface, user interface (UI) elements in a first arrangement. A first UI element of the UI elements (i) corresponds to a set of computer applications or computer files, (ii) is associated with a plurality of attributes about the set, and (iii) is configured to, upon selection via the user interface, launch a computer application or a computer file of the set, or a page about the set. The method also includes receiving a request to sort the UI elements on the user interface. The request includes a selection of a first attribute of the plurality of attributes. The method also includes sorting the UI elements based on the first attribute to generate a second arrangement of the UI elements, and determining, for the first UI element, information about the set. The information includes the first attribute and excluding a second attribute of the plurality of attributes. The method also includes presenting, on the user interface and in response to the request, the UI elements in the second arrangement and the information determined for first UI element.

In an example, the information determined for the first UI element includes a value of the first attribute and excludes remaining attributes of the plurality of attributes. In this example, presenting the information includes presenting the value in the first UI element and excluding a presentation of the remaining attributes in the first UI element. Or, presenting the information includes presenting the value within a predefined distance from the first UI element and excluding a presentation of the remaining attributes.

In an example, the method also includes prior to presenting the UI elements in the first arrangement, sorting the UI elements based on a default subset of the plurality of attributes to generate the first arrangement. The default subset includes (i) a newness attribute about a computer application being acquired but not executed within a predefined time period from acquisition, and (ii) an update attribute about an update to the computer application since a last execution of the computer application. In this example, the default subset further includes a recency attribute about at least one of (iii) a last execution date of the computer application, (iv) an acquisition date of the computer application, or (v) an availability date of when the computer application became available on the computer device to a user identifier. Further, the UI elements are sorted based on the default subset by arranging the UI elements according to the newness attribute first, the update attribute next, and the recency attribute last.

In an example, the method also includes receiving a second request to sort the UI elements on the user interface. The second request includes a selection of the second attribute. The method also includes sorting the UI elements based on the second attribute to generate a third arrangement of the UI elements, determining, for the first UI element, second information about the set. The second information includes the second attribute and excluding the first attribute. The method also includes presenting, on the user interface and in response to the second request, the UI elements in the third arrangement and the second information determined for first UI element. In this example, prior to receiving the second request, the first attribute is presented in the first UI element or within a predefined distance from the first UI element, and after receiving the second request, the first attribute is no longer presented and the second attribute is presented in the first UI element or within the predefined distance from the first UI element.

In an example, each of the first arrangement and the second arrangement corresponds to a non-focused presentation state, and the method further includes receiving a request to present the UI elements in a focused presentation state, and presenting, in the focused presentation state, the UI elements in the second arrangement, the information determined for the first UI element, and additional information determined for the first UI element, the additional information including the second attribute. In this example, the method also includes storing a first association between a first subset of the plurality of attributes and the non-focused presentation state and a second association between a second subset of the plurality of attributes and the focused presentation state. Further, in the non-focused presentation state, the UI elements are presented in the first arrangement based on the first association, in the non-focused presentation state, the UI elements are presented in the second arrangement based on the first association and by limiting the information to the first attribute, and in the focused presentation state, the UI elements are presented in the second arrangement based on the second association.

In an example, the method also includes the first UI element corresponds to a first computer application. The first attribute includes: a last execution date of the first computer application on the computer device, an availability date of when the first computer application became available on the computer device to a user identifier, or a length of time the first computer application was executed in association with the user identifier.

In an example, the method also includes the first UI element corresponds to a first computer application. The first attribute includes: a version of the first computer application, or a compatible version of the computer device to run first computer application.

In an example, the method also includes the first UI element is an icon corresponding to an application group that includes computer applications. The computer applications of the application group are different variations of a same computer program. In this example, the computer program is a video game title, wherein the computer applications of the application group are video game variations, and wherein the icon includes content common to the video game variations and identifies one of the video game variations.

In an example, a computer device implements the above method. The computer device includes one or more processors, and one or more memories storing computer-readable instructions that, upon execution by the one or more processors, configure the computer device to perform operations of the above method.

In an example, a non-transitory computer-readable storage medium stores computer-readable instructions that, upon execution on a computer device, cause the computer device to perform operations. The operations correspond to the above method.

DETAILED DESCRIPTION OF THE INVENTION

Figure 1:
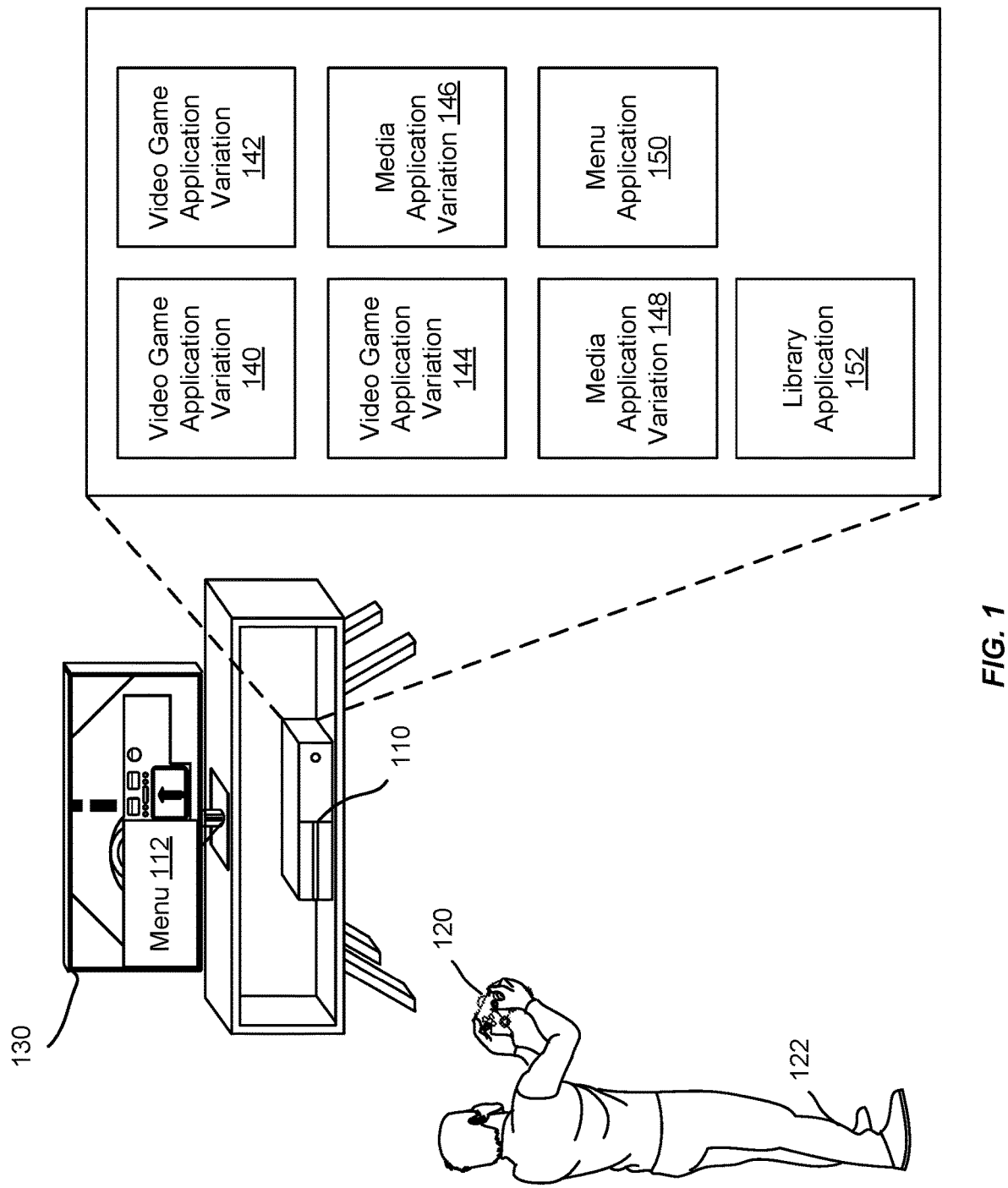
FIG. 1 illustrates a computer system that presents a menu, according to an embodiment of the present disclosure.

Generally, systems and methods for a more intuitive and efficient GUI. In an example, a computer system executes an application. The application presents UI elements in a particular arrangement on a GUI. Each of the UI elements corresponds to a set of computer applications (e.g., a first UI element corresponds to variations of a same video game application) or computer files (e.g., the first UI element corresponds to variations of a same video file). Each of the UI element is also associated with attributes about the set (e.g., the first UI element is associated with a file size, a download date, etc.). From an input device, a request is received to sort the UI elements and indicates one of the attributes for the sorting (e.g., file size). The application sorts the UI elements based on the indicated attribute to generate a new arrangement (e.g., the UI elements are sorted in a descending file size order, where each file size corresponds to the underlying computer application, computer file, or variation thereof as applicable). For each of the UI elements, the application also determines information to present in association with the UI element. The information can include the indicated attribute and exclude remaining attributes that were not indicated in the request (e.g., for the first UI element, the information includes the file size and excludes the download date). The application updates the GUI to present the UI elements in the new arrangement and the information determined for each of the UI element. For a UI element, the corresponding information can be presented within the UI element or at a predefined distance away from the UI element. In this way, not only can the GUI present the UI element in a desired sort order, but also the GUI indicates information relevant to the sort and excludes other less relevant information.

To illustrate, consider an example of a video game console. In this example, the video game console includes multiple video game applications. One of these applications, a car racing video game application, has four variations: a demo version, a trial version, a beta version, and a full version. A user login to the video game console is performed under a user account. Following the login, an application executing on the video game console presents a library of the video game applications. The library includes a grid arrangement of tiles, where each tile corresponds to one of the video game applications. In particular, the car racing video game application is shown with a single tile and this tile is linked to one of the variations (e.g., the full version). The full version was downloaded to the video game console four months ago, uses two gigabyte of storage space, has three-hundred hours of play time on the video game console in association with a user account. Upon the login, the grid arrangement follows a default sort, showing the different tiles. Upon receiving a request to sort the tiles according to the play time, application determines that the full version of the car racing video game application has the largest number of hours of play time (e.g., three-hundred hours in this example), following by a second video game application, and so on and so forth. Accordingly, the applications re-orders the tiles in the grid arrangement to show the tile of the full version as the first tile (e.g., the top left tile), followed by the one of the second video game application, and so on and so forth. In addition, the application shows the number of play time hours in association with each tile, but does not show the download date, the storage space size, or any other sortable attributes. For instance, in the first tile corresponding to the full version, a container is included and shows three-hundred hours. In this way, the GUI can particularly inform a user about the reason for the sort by showing the value of the requested sort attribute per tile. In other words, the GUI is more intuitive because it presents only the relevant information that resulted in the sort and is more efficient because it declutters the GUI by filtering out irrelevant information.

Embodiments of the present disclosure provide many technological improvements over GUIs that present information about computer applications or computer files. In particular, the embodiments facilitate a GUI that shows specific attributes used in the sorting of UI elements and removes other less relevant attributes, thereby providing particularly relevant information to a user and decluttering the GUI space from other less relevant information. In addition, and as further described herein below, a UI element can correspond to multiple variations of a same computer application or computer file. In this way, rather than having to present multiple UI elements for a same computer application or computer file (e.g., one per variation), a single UI element is used, further improving the intuitiveness and efficiency of the GUI.

In the interest of clarity of explanation, various embodiments of the present disclosure are described in connection with a video game console that presents a library. However, the embodiments of the present disclosure are not limited as such. Instead, the embodiments similarly apply to any type of computer system, including a distributed computing system (e.g., a computing cloud communicatively coupled with a user device). A computer system presents a GUI that includes UI elements. The UI elements can be sorted for presentation in an arrangement. While the sorting is performed according to a set of attributes from multiple sortable attributes, the presentation can show information specific to the set of attributes and can exclude showing information specific to the remaining sortable attributes.

Also in the interest of clarity of explanation, various embodiments of the present disclosure are described in connection with video game applications. However, the embodiments of the present disclosure are not limited as such. Instead, the embodiments similarly apply to any type of computer application and to any type of computer file. In particular, a UI element can correspond to a computer application and can be selected to launch (e.g., execute) the computer application or launch (e.g., load) a page that provides information about the computer application. Further, a computer application can have multiple variations on a computer system. The multiple variations can be associated with a same group and the group can be presented by a UI element. In this case, the UI element can indicate one of the variations and can be selected to launch (e.g., execute) the variation of the computer application or launch (e.g., load) a page that provides information about the group or the variation. Additionally or alternatively, a UI element can correspond to a computer file and can be selected to launch (e.g., open) the computer file or launch (e.g., load) a page that provides information about the computer file. Here also, a computer file can have multiple variations on a computer system. The multiple variations can be associated with a same group and the group can be presented by a UI element. In this case, the UI element can indicate one of the variations and can be selected to launch (e.g., open) the variation of the computer file or launch (e.g., load) a page that provides information about the group or the variation.

Further, and in the interest of clarity of explanation, various embodiments of the present disclosure are described in connection with a grid of tiles. However, the embodiments of the present disclosure are not limited as such. Instead, the embodiments similarly apply to any other type of arrangement and to any other type of UI element. A grid is merely one example of possible arrangements. Such arrangements can include a list, an array, tabs, a vertical arrangement, a horizontal arrangement, and a multi-dimensional arrangement. In addition, a tile is merely one example of possible UI elements. A UI element is presentable on a GUI and is selectable to launch a computer application, computer file, and/or page. Other examples of a UI element includes an icon, a thumbnail, an entry in a list, and multiple entries in a row of a list or a column of a list.

FIG. 1 illustrates a computer system that presents a menu, according to an embodiment of the present disclosure. As illustrated, the computer system includes a video game console 110, a video game controller 120, and a display 130. Although not shown, the computer system may also include a backend system, such as a set of cloud servers, that is communicatively coupled with the video game console 110. The video game console 110 is communicatively coupled with the video game controller 120 (e.g., over a wireless network) and with the display 130 (e.g., over a communications bus). A video game player 122 operates the video game controller 120 to interact with the video game console 110. These interactions may include playing a video game presented on the display 130, interacting with a menu 112 presented on the display 130, and interacting with other applications of the video game console 110 (e.g., with media applications to stream media from an online content source or to open a computer file from local storage of the video game console 110).

The video game console 110 includes a processor and a memory (e.g., a non-transitory computer-readable storage medium) storing computer-readable instructions that can be executed by the processor and that, upon execution by the processor, cause the video game console 110 to perform operations related to various applications. In particular, the computer-readable instructions can correspond to program codes for the various applications of the video game console 110 including variations 140, 142, and 144 of a video game application and variations 146 and 148 of a media application. Of course, there may be more than one video game application and more than one media application. A video game application generally represents a computer application executable to present video game content, receive user interaction with the video game content, and accordingly update the video game content. A media application generally represents a computer application executable to present media content including audio, video, and/or other media types, receive user interaction with the media content, and accordingly update the media content. The media content can be streamed from a remote content source or can be presented form local storage of the video game console 110. Further, other applications can be likewise included in the video game console 110, such as a social media application, a chat application, and the like. Some of these applications can open computer files available from local storage of the video game consoler 110 or from a remote storage location. Each of the computer files can also have multiple variations, stored locally or remotely. The availability of a video game application, media application, and/or other type of computer application to the video game player 122 via the video game console 110 can depend on a user identifier of the video game player 122 (e.g., upon a login to the video game console 110, the availability of the computer applications can depend on the user identifier used in the login). In addition, the video game console 110 includes a menu application 150 and a library application 152. The menu application 150 can present a home UI in a GUI of the display 130. The library application 152 can present a library of UI elements in a library menu on the GUI (e.g., tiles as further described in the next figures).

The video game controller 120 is an example of an input device. Other types of the input device are possible including, a keyboard, a touchscreen, a touchpad, a mouse, an optical system, or other user devices suitable for receiving input of a user.

Upon an execution of the video game application variation 140 by the video game console 110, a rendering process of the video game console 110 presents video game content (e.g., illustrated as a car race video game content) on the display 130. Upon user input from the video game controller 120 (e.g., a user push of a particular key or button), the rendering process also presents the menu 112. Depending on the user input, the menu 112 corresponds to the home UI menu or the library menu. The menu 112 can be presented in a layer over the video game content.

Upon the presentation of the menu 112, the user control changes from the video game application variation 140 to an underlying application (e.g., the menu application 150 or the library application 152, as applicable). Upon a receiving user input from the video game controller 120 requesting interactions with the menu 112, the underlying application supports such interactions by updating the menu 112 and launching any relevant computer application, computer file, or page in the background or foreground. The video game player 122 can exit the menu 112 or automatically dismiss the menu 112 upon the background or foreground launch. Upon the exiting of the menu 112 or the dismissal based on the background or foreground, the user control changes from the underlying application to the video game application variation 140. If a foreground ground computer application, computer file, or page is launched, the user control changes from the underlying application to the launched computer application, computer file, or page instead. In both cases, further user input that is received from the video game controller 120 is used for controlling the relevant computer application, computer file, or page and/or for requesting the menu 112 again.

Figure 2:
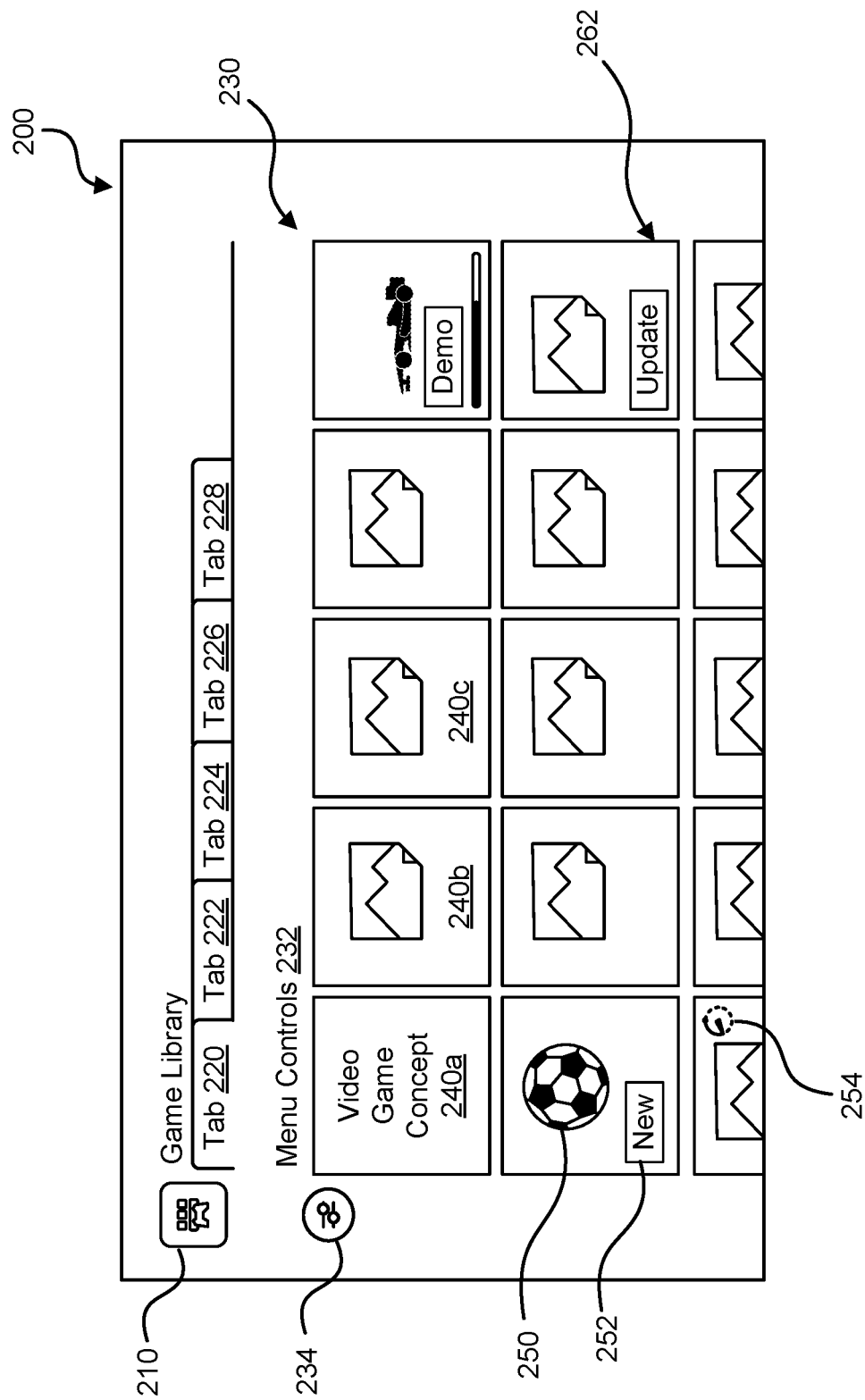
FIG. 2 illustrates an example of a library with tiles in a glanced state, according to an embodiment of the present disclosure.

FIG. 2 illustrates an example of a library 200 with tiles in a glanced state 262, according to an embodiment of the present disclosure. As shown in FIG. 2, the library 200 organizes multiple UI elements permitting navigation and interaction with different computer video game application available via a video game console (e.g., the video game console 110 of FIG. 1). In some embodiments, the library 200 includes one or more top-level UI elements, including an icon 210 and one or more tabs 220-228. The icon 210 may be an interactive and/or dynamic UI control element that is configured to receive user input and to execute one or more actions depending on the type of input received. For example, the icon 210 may be presented in the library as a static badge or icon representing a stylized arrangement of tiles, where the icon 210 may act as a home control to leave the library 200 (e.g., exit, minimize, hide the library UI, etc.). The one or more tabs 220-228 may be linked and/or associated to different content and/or application types available via the video game console. For example, the tab 220 as illustrated in FIG. 2 corresponds to a menu that includes tiles for video game applications. The tab 220 may be associated and/or linked to a particular category of video game applications, such as video game applications that are associated with a "collection" category specific to a user account. The collection may include, but is not limited to, user-obtained video game applications (e.g., ordered, downloaded, installed from a content network or an online game content platform), previously played video game applications, and other video game applications that a user with access to the user account has interacted with.

In another example, the tabs 220-228 may be associated with different categories of video game applications. For example, the tab 222 may be associated and/or linked to "installed" video game applications that are installed on the video game console or on an external memory in communication with the video console. In some embodiments, installed content (e.g., an installed video game application) may be available without access control, such that any user of the video game console may launch or otherwise access the installed content. Alternatively, the library 200 may be user specific, such that access to applications and content may be limited based on privileges specific to the user account. The tab 224 may be associated and/or linked to "shared" video game applications for which access has been granted by the user account to other user account. As an illustrative example, a video game application may have been obtained by a different user and, rather than being entirely installed locally on the video game console, stored or otherwise provided at least partly by an online content distribution network (e.g., elements of the video game application may be installed locally while elements are stored or provided by the network). The tab 226 may be associated and/or linked to a membership program that provides privileged access to video game applications for the specific user account. In another example, the tab 228 may be associated and/or linked to a streaming platform for users of the video game console.

As further illustrated in FIG. 2, the library 200 presents a grid of tiles in a menu 230. The menu 230 may include menu controls 232 to control aspects of the presentation of the menu 230 including, but not limited to the number of tiles, the arrangement of tiles, the sorting of tiles, etc. The menu controls 232 may be presented as text or as a control icon 234 that, when interacted with by the video game player, generates and/or presents one or more menu controls (e.g., via a control panel UI) to adjust the appearance, select a sorting factor, update the arrangement, or change the layout of the menu 230.

FIG. 2 shows the menu 230 including a grid of tiles presenting content associated with multiple video game concepts. The term "concept" is described in more detail in reference to FIG. 4. The menu 230 may be sorted based on sorting logic as further described in FIGS. 7-13. In the grid, a first video game concept tile 240a (e.g., top left tile) may be the latest played game concept, while the second video game concept tile 240b (e.g., tile to the right of the top left file) may be the second most recently played, the most recently obtained, or the like, with the third video game concept tile 240c being less recently played or purchased than both the first video game concept tile 240a and the second video game concept tile 240c. Other ordering may be employed to arrange the tiles, as described in more detail in FIGS. 7-13.

As illustrated in FIG. 2, the library 200 presents the menu 230 with tiles in the glanced state 262. The glanced state 262

(also referred to as the glanced presentation state) is a presentation state on a GUI in which limited but sufficient information is presented such that a viewer of the menu 230 can quickly assimilate the information and take action (including requesting any additional information, which then modifies the presentation state to a focused state, described below). The glanced state 262 may present tiles with application information superimposed on the tile or otherwise displayed in the menu 230. For example, a tiles may include a content 250 (e.g., a logo, badge, character, screenshot, poster image, video clip, animation, etc.) representative of the video game concept associated with the game. The tile in the glanced state 262 may also show an attributes 252 and an indicator, whose function, contents, and purpose are described in connection with FIG. 6.

Figure 5:
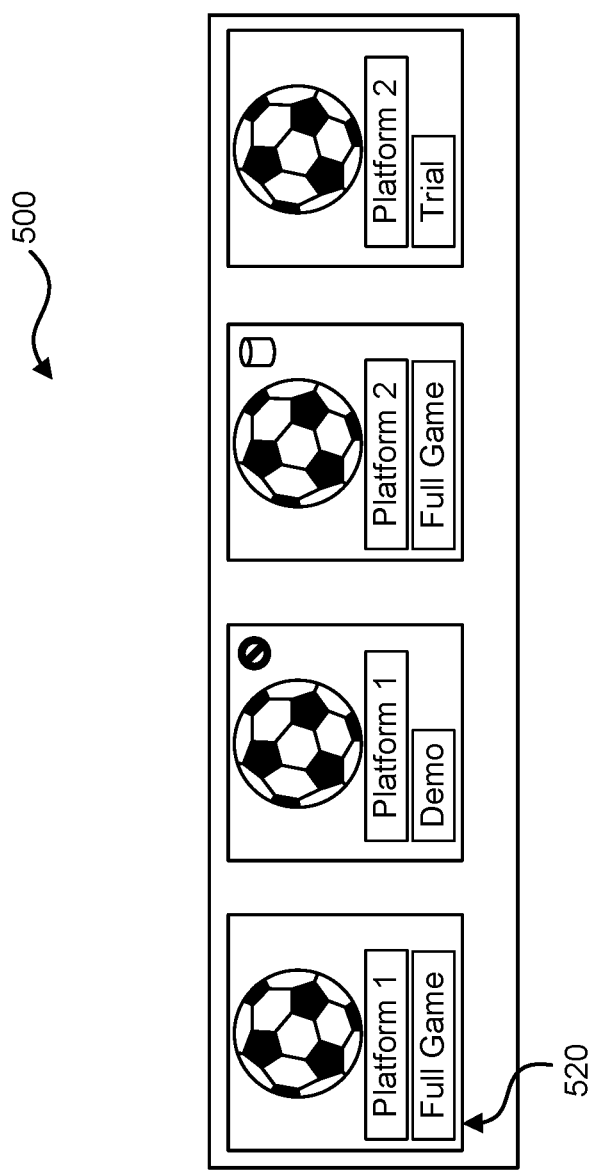
FIG. 5 illustrates an example of a dynamic update to a tile, according to an embodiment of the present disclosure.
Figure 5:
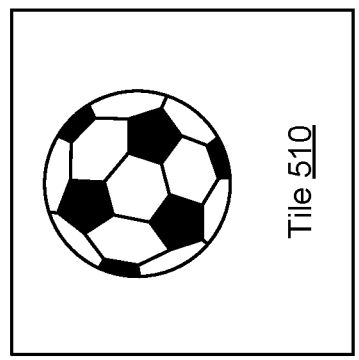

A tile is an example of a UI element and correspond to a concept defined for a single video game application, as described in more detail in reference to FIG. 5. The concept groups a set of variations of the video game application (e.g., video game application variations 140-146 of FIG. 1). Although the set can be a single variation, the set can alternatively include multiple variations. Each variation can be a video game application on its own (e.g., a different version of the video game application, such as a demo version, a trial version, a beta version, or a full release version). The tile shows content common to the variations (e.g., (a logo, badge, character, screenshot, poster image, video clip, animation, etc.), indicates one of the variations (for example, using application metadata), and is linked to the one variation and/or to a page that presents more information about the concept and the variations.

As illustrated in FIG. 2, a tile is shown per video game concept. Alternatively, a concept can similarly apply to grouping a set of variations of a media application or a computer file (e.g., JPEG, BMP and other variations of a same image file, an MPEG-2, MPEG-3, MPEG-4, or other variations of an audio file, a high resolution, a medium resolution, and a low resolution, or other variations of a video file, etc.). In the case of a media application, the tile depicts content common to the variations of the media application, indicates one of the variations, and is linked to this variation and/or to a page that presents more information about the media concept and the variations. In the case of a computer file, the tile shows content common to the variations of the computer file, indicates one of the variations, and is linked to this variation and/or to a page that presents more information about the file concept and the variations. In both cases, there may be a media library or a file library, each presenting the applicable tiles similarly to the library 200.

Figure 3:
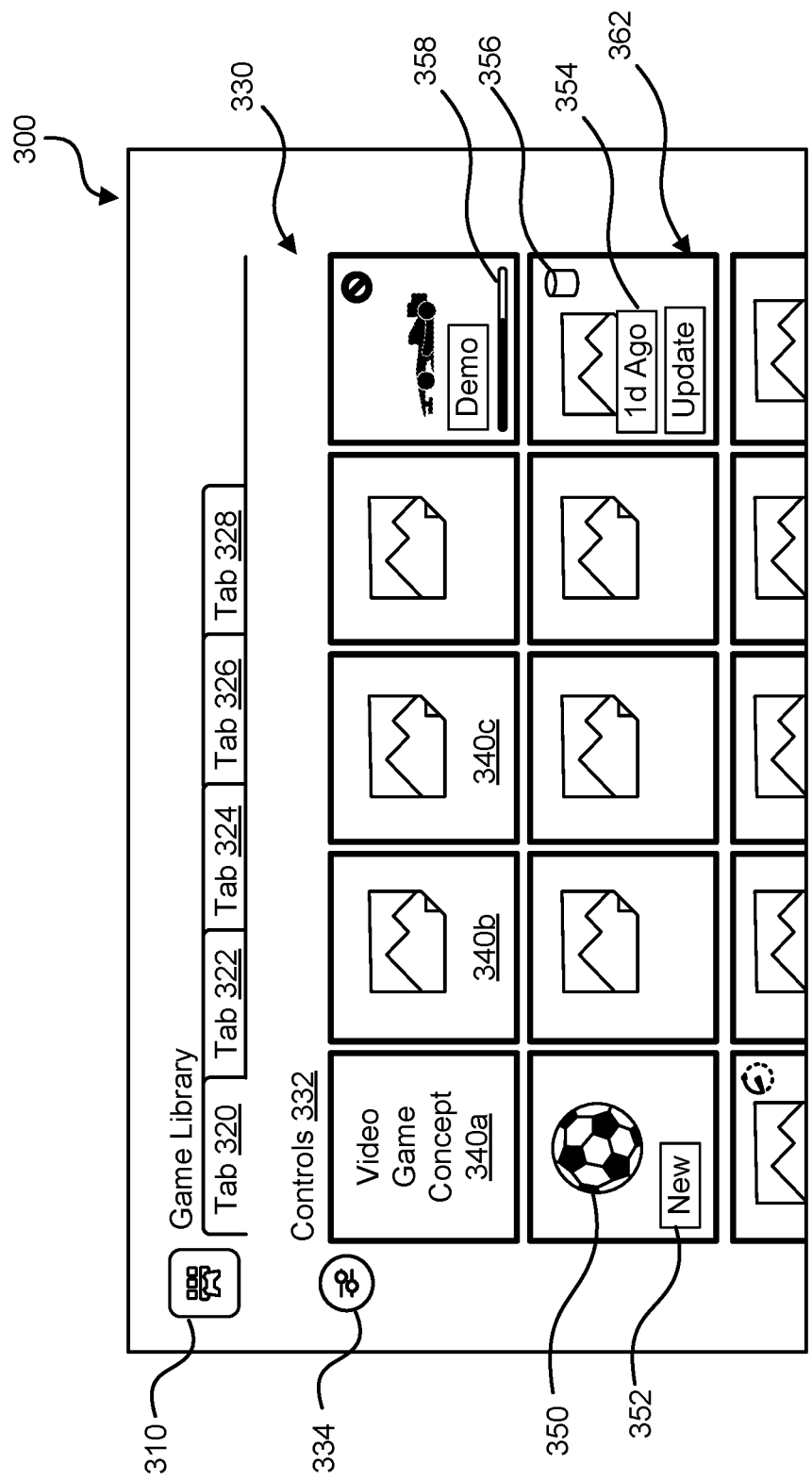
FIG. 3 illustrates another example of a library with tiles in a focused state, according to an embodiment of the present disclosure.

FIG. 3 illustrates another example of a library 300 with tiles in a focused state 362, according to an embodiment of the present disclosure. The focused state 362 (also referred to as the focused presentation state) is a presentation state on a GUI in which detailed information (e.g., additional information relative to the glanced state) is presented such that a viewer of the tile can receive more description and have more options to initiate actions.

The library 300 in FIG. 3 includes an icon 310, tabs 320-328, a menu 330, and menu controls 332 and 334, fulfilling similar functions as the corresponding elements of the library 200 of FIG. 2. In general, the focused state 362 has additional application information presented with the tiles, but does not affect the order or arrangement of the tiles in the menu 330 (e.g., if the video game concept tiles are preserved as from the glanced state, the video game concept tile 340a is presented in a higher position in the order relative to the video game concept tiles 340b-c). The focused state 362 may be indicated graphically by a highlighted or otherwise graphically emphasized boundary on the tiles as shown in the menu 330. Relative to the glanced state, the focused state 362 may one or more additional attributes 354 and one or more indicators 356 per tile. The set of attributes and/or indicators that are presentable in the glanced state and the different set of attributes and/or indicators that are presentable in the focused state depends on stored associations between the sets and the presentation states.

Among other benefits, implementing both the glanced and focused states may reduce demand on system resources needed to populate every tile with information, while providing pertinent info to the user. In particular, when the menu 230 is first presented with tiles in the glanced state 262, the menu 262 includes a minimum of relevant information to process and display. The focused state 362, being generated and/or presented in response to a user request for additional information, provides sufficient additional information only when needed.

Figure 4:
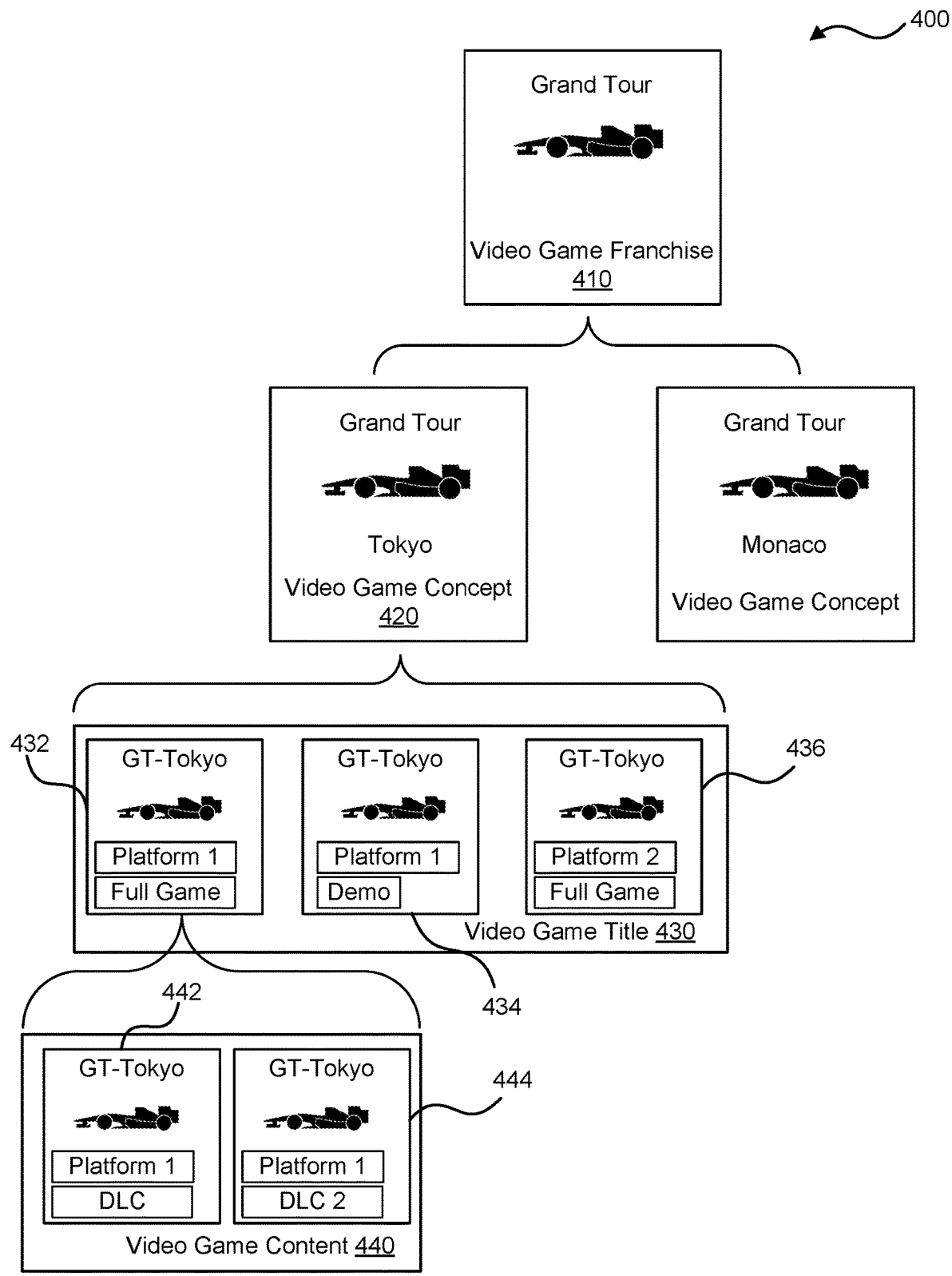
FIG. 4 illustrates an example of an application data hierarchy, according to an embodiment of the present disclosure.

FIG. 4 illustrates an example of an application data hierarchy 400, according to an embodiment of the present disclosure. Each tile presented in a library (e.g., the library 200 of FIG. 2 and the library 300 of FIG. 3) represents a video game concept that can group multiple variations of a same video game application. To better describe the video game concept, FIG. 4 illustrates the application data hierarchy 400 including a video game concept 420 and a video game title 430 (e.g., a video game application). For a racing game (e.g., video game concept 420 of FIG. 4), a video game franchise 410 represents every video game concept that is available to the user. In some embodiments, this may correspond to separately developed games within a family of games, each of which can be a separate video game title, such as sequels, prequels, editions, annual editions, etc. Hierarchically, the video game franchise 410 may be organized as one degree higher that the video game concept 420.

Within the video game franchise 410, one or more video game concepts may be defined. Each of the video game concept associates a set of variations of a video game title together. For example, variations 432, 434, and 436 of a single video game title 430 are associated in the video game concept 420. The video game concept 420, as opposed to the video game franchise 410, may include only variations of a single video game title. A variation of a represents one set of program code that is different from another set of program code defined for another variation. For example, the variation can be a particular version of the video game application (e.g., a demo version, a trial version, a release version), a variation of any these versions compatible with a generation of a video game system (e.g. a video game platform), a variation of these versions specific to a geographical region, or a variation of these versions specific to a year (e.g., a 2019 release, a 2020 release, etc.). In the illustration of FIG. 4, the video game concept 420 may include a full game for a first video game platform 432, a demo of the full game for the first video game platform 432, and a full game for a second video game platform 436 for the same video game title 430 (e.g., "Grand Tour—Tokyo").

The data hierarchy 400 may define multiple hierarchy levels for a video game concept. For instance, the data hierarchy 400 may include, subordinate to a video game title or any of its variations. These subordinates can also be referred to as variations of the video game title. For instance, a variation with a particular set of game levels and/or events can be a subordinate. This is shown in FIG. 4 with video game content 440 that may be associated with one of the video game variations (e.g., the variation 432 corresponding to a full release for the first platform). Examples of video game content 440 may include, but are not limited to, featured add-on content, patches, limited-time online events, or the like. For example, a first downloadable content (DLC) module 442 and a second DLC module 444 may be associated with the full release for the first platform (e.g., the variation 432).

FIG. 5 illustrates an example of a dynamic update 500 to a tile 510, according to an embodiment of the present disclosure. As illustrated in FIG. 5, the tile 510 represents a video game concept. The video game concept can group multiple variations of a same video game title. In the example illustrated, the tile shows 510 content common to the different variations (e.g., a poster image, a short video clip, an animation, and/or other multimedia content). The tile 510 also indicates one of the variations (e.g., with indicators and/or attributes), where this variation is selected based on logic and corresponds to the variation that is likely most relevant to a user. Because the user's interest can change over time, the tile 510 is dynamically updated to change the indication and reflect the latest selected variation of likely most interest to the user. The content may not change.

For example and as illustrated in FIG. 5, the variations of the video game title include a full release for a first video game platform, a demo release for the first video game platform, a full release for a second video game platform, and a trial version for the second video game platform. As indicated by attribute and indicator information, the tile 510 is updated over time to indicate each of the variations upon a selection of that variation. Hence, when the user's interest likely corresponds to the first variation, the tile 510 indicates the full release for a first video game platform. When the user's interest likely corresponds to the second variation, the tile 510 indicates the demo release for the first video game platform. When the user's interest likely corresponds to the third variation, the tile 510 indicates the full release for the second video game platform. And when the user's interest likely corresponds to the fourth variation, the tile 510 indicates the trial version for the second video game platform. These dynamic updates to the tile 510 are shown with the element labeled 520 in FIG. 5.

As described herein above, the tile 510 indicates one of the variations at a time, and can be linked to this variation. The selection of the variation from the multiple variations is based on a set of logic implemented by a library application (e.g., the library application 152 of FIG. 1). In some cases, the logic for the selection can rely on different factors. In particular, a first set of factors is used in the absence of a user interaction with a variation or the tile 510. A second set of factors is sued when such a user interaction is received.

According to the first set of factors, a variation is selected by the library application by prioritizing one or more characteristics of the variations. For example, priority may be given to playable variations over non-playable variations, where playability implicates access privileges and permissions including, but not limited to, sharing, ownership, association of a variation with the account through which the video game application would be accessed. In reference to the video game title 530 illustrated in FIG. 5, a playable demo release for the first video game platform may be prioritized over a non-playable full release for the same platform. The selection may also prioritize backwards-compatible variations over non-backwards compatible variations, installed variations over not installed variations, variations compatible with new or next-generation video game console systems over variations compatible previous or legacy video game console systems. Furthermore, priority may be given to full versions of the video game application over partial or developmental versions. For example, a developmental version (e.g., alpha or beta versions) may be prioritized over a demo version. Similarly, a full version may be prioritized over a beta version and a demo version.

In addition, when regional variations of the video game application exist, a variation may be selected based on regional information associated with the user of the console system or a location of the console system (e.g., network location or geographic location). For example, the user of the console system may have an account on that is identified with a geographic region (e.g., Japan, North America, etc.). In such cases, the console system may include multiple variations, each corresponding to a region (e.g., a Japanese variation and a North American variation), for which priority can be given to the regional variation corresponding to the geographic region identified with the account of the user. In some embodiments, when multiple variations identified with the same geographic region are available (e.g., installed), priority is given to the most recent variation (e.g., most recently installed variation). Similarly, if the variations are not installed, priority may be given to variations depending on availabilities. Examples of such availabilities include, but are not limited to, variations available from online gaming platforms associated with the console system, most recently purchased variations, most recently available variations, or the like.

According to the second set of factors, a user interaction triggers the library application to potentially replace the indication and linkage of the tile 510 from a current variation to another variation. The second set of factors include, but not limited to, whether a video game application variation is played and/or launched, whether a video game application variation is downloaded, copied, and/or installed from external media, whether the video game application variation is selected via a menu operation through the library (e.g., by clicking on the tile 510 to receive a list of the variations and selecting one of them) or externally to the library (e.g., by selecting the variation from a page about the video game concept), whether the video game application variation is purchased or otherwise obtained and is new to the system, or the like. The purpose of prioritizing such user interactions is to dynamically select and indicate the variation, where this variation best reflects the user interest. In some embodiments, the user interaction may not trigger reselection in some cases including, but not limited to, when a video game application variation is made available from an external hard drive to which it has already been installed, as this may not reflect user preference for a video game application variation without additional data describing the user's interaction history with the relevant video game variation (e.g., a "last played" data point). Similarly, if the user interaction concerns a video game application variation that is not operable (e.g., uninstalled, not backwards compatible, etc.), the user interaction may not trigger reselection based on the interaction. In the specific case of uninstallation, a user interaction to uninstall a video game application variation may trigger reselection according to the first set of factors rather than the second set of factors.

Figure 6:
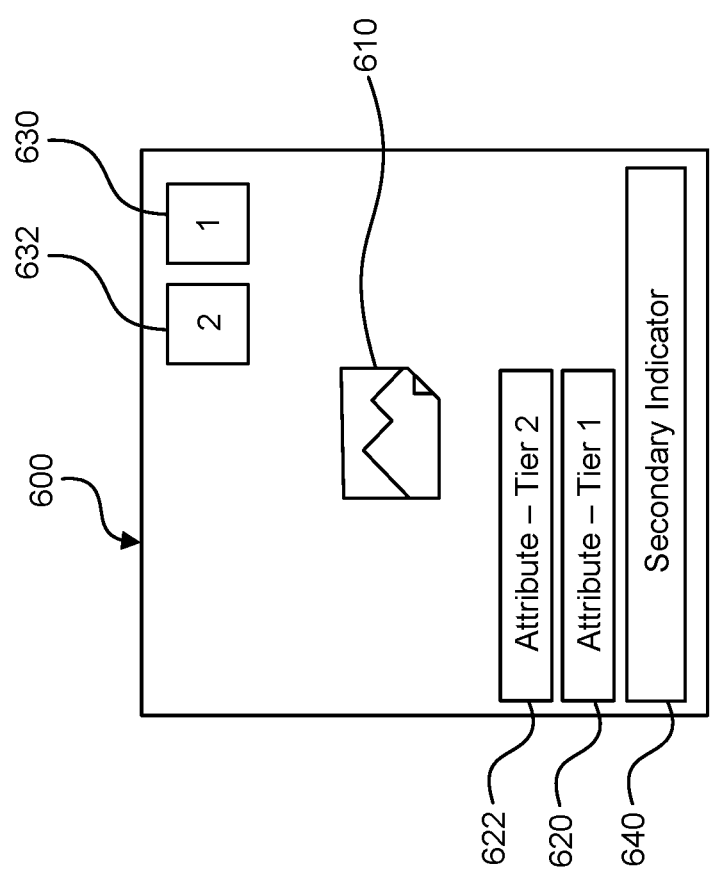
FIG. 6 illustrates an example of information presentable in a tile, according to an embodiment of the present disclosure.

FIG. 6 illustrates an example of information presentable in a tile 600, according to an embodiment of the present disclosure. Generally, the tile 600 is an example of a UI element that represents a set of variations of a video game application. The layout and composition of the tile 600 illustrated in FIG. 6 is an example of one of several possible visualization approaches. While the tile 600 is shown with a number of containers (indicated with elements numbers 620, 622, 630, 632, and 640) oriented in regions of the tile 600 and superimposed over a visual motif 610 representative of the video game concept (e.g., content common to the different variations associated with the video game concept), the information described in reference to the containers may also be presented elsewhere. For example, the tile 600 may present only a subset of the containers, while others are presented outside the boundary of the tile 600. In another example, the tile 600 may be presented in a list or a detailed list, with information arranged in a table oriented horizontally and/or vertically relative to the tile 600, such that the visual motif 610 serves as an icon and/or badge in one entry of a list entry and the containers (or content thereof) can be shown in one or more entries of the list entry.

In some embodiments, the tile 600 includes one or more attributes and indicators. The attribute(s) and indicator(s) can be presented in the containers. A first set of attributes and/or indicators can be associated with a glanced state (e.g., the glanced state 262 of FIG. 2), and a second set of attributes and/or indicators can be associated with a focused state (e.g., the focused state 362 of FIG. 3). Given these associations, the number of containers and/or content thereof can change depending on the presentation state (e.g., the glanced state or the focused state). Further, attributes may be organized in tiers, such as a first tier 620 or a second tier 622, although additional tiers are available as needed. With regard to glanced and focused presentation states, the focused state may present additional and/or differing information to that presented in the glanced presentation state.

In some cases, the first tier attributes 620 represent metadata indicating a variation of the video game application, where the variation is indicated by the tile 600. Examples of metadata include, but are not limited to information describing the use and newness of the variation (e.g., whether the variation is new or newly updated, when it was last played, when it was purchased or available, etc.). The metadata may also include information about the file size of the variation (e.g., to identify to the user of the video game console information related to storage capacity and file sizes). Similarly, the metadata may include usage data including, but not limited to cumulative play time (e.g., "hours played"), recent accomplishments, and/or other available content-related information items (e.g., tournament date, item available, reward earned, etc.).

In comparison, the second tier attributes 622 represent supplementary metadata to the first tier attributes 620. Supplementary metadata may include, but is not limited to, platform information (e.g., new or next-generation console, previous or legacy console, etc.), version information and/or application type (e.g., beta, trial, demo, full game, etc.), information indicating the type of video game content, as when the variation includes video game content (e.g., DLC, temporary campaign mission options, etc.). In some embodiments, the tile 600 may show multiple second tier attributes 622, for example, the platform information and the version information (e.g., a beta version on a legacy console). In some embodiments, one or more of the second tier attributes 622 are presented in the focused state, while the glanced state presents only one or more of the first tier attributes 620. In this case, the second tier attributes 622 are associated with the focused state only, whereas the first tier attributes 620 are associated with both presentation states.

In some embodiments, the library application can select a limited number of metadata entries to present as first tier attributes 620 and second tier attributes 622 with the tile 600. The selection may proceed based on sorting of attributes and/or on a priority ranking of the attributes. For example, information describing new variations or newly updated variations may be prioritized over information describing the date of purchase or availability of a variation. Second tier attributes 622, being descriptive of the variation, may be selected based on characteristics of the variation. For example, if the variation is a demo version on a next-generation console, the second tier attributes presented with the tile 600 may reflect that information.

The indicators may belong to several orders, including, but not limited to primary and secondary orders, with tiers defined for each order. For example, a primary indicator of the first tier 630 may be presented in association with the tile 600 to represent, among other aspects, the "access status" for the variation that is indicated by the tile 600. In some embodiments, "access status" indicates whether and in what form the variation is available for execution. As an illustrative example, in the glanced state, the primary indicator of the first tier 630 may indicate that the variation is "pre-ordered," which is to say that the variation has been purchased or otherwise reserved, but has not yet been published or otherwise made available for distribution via a computer network. In some embodiments, multiple first tier primary indicators 630 may describe the access status of the variation, in which case the library application may implement a selection process to select an indicator to present as part of the tile 600. In some cases, the tile only presents a single indicator of each tier, and as such may select an indicator based on a priority ranking defined for each of the possible indicator values. For example, compatibility indicators may have a higher priority than platform indicators, and media-type indicators may have a higher priority than access-lock indicators. In some embodiments, some types of information for the primary indicator of the first tier 630 is only presented with the tile 600 in the focused state. For example, in the glanced state, the first tier primary indicator may present information when the variation is inaccessible, while in the focused state access information may be available describing whether and how the variation is accessible (e.g., located on local storage media, accessible from a content network, etc.).

The primary indicator of the second tier 632 may present additional information describing storage status including, but not limited to, whether the variation is installed and on which video game platform it is installed. For example, the primary indicator of the second tier 632 may provide information describing whether data associated with the variation is stored locally on the video game console, on an external hard drive in communication with the video game console, or is otherwise available for download. To indicate that a download is necessary to access the variation, the primary indicator of the second tier 632 may provide information to that effect, for example, by showing an icon representing a download process. As with the primary indicator of the first tier 630, in some embodiments, the tile 600 may only show a single primary indicator of the second tier 632, which is selected from amongst the applicable indicators describing the storage status of the video game application associated with the tile 600.

The secondary indicator 640 may be included with the tile 600 to provide dynamic information related to system processes associated with the variation. For example, the secondary indicator may be presented as a graphical progress bar showing, by a combination of visual effects including but not limited to color, dynamic elements, shading, and/or lighting effects. For example, the secondary indicator 640 may indicate a download in progress by a progress bar with a gradient shading, showing the extent to which the download has progressed for the variation in real time. In another example, the secondary indicator 640 may show a progress bar with a different color (e.g., a solid red progress bar showing the download extent at the time the error occurred) to indicate a progress event or download type including, but not limited to, a complete download, an update download, a patch download, or the like.

Figure 7:
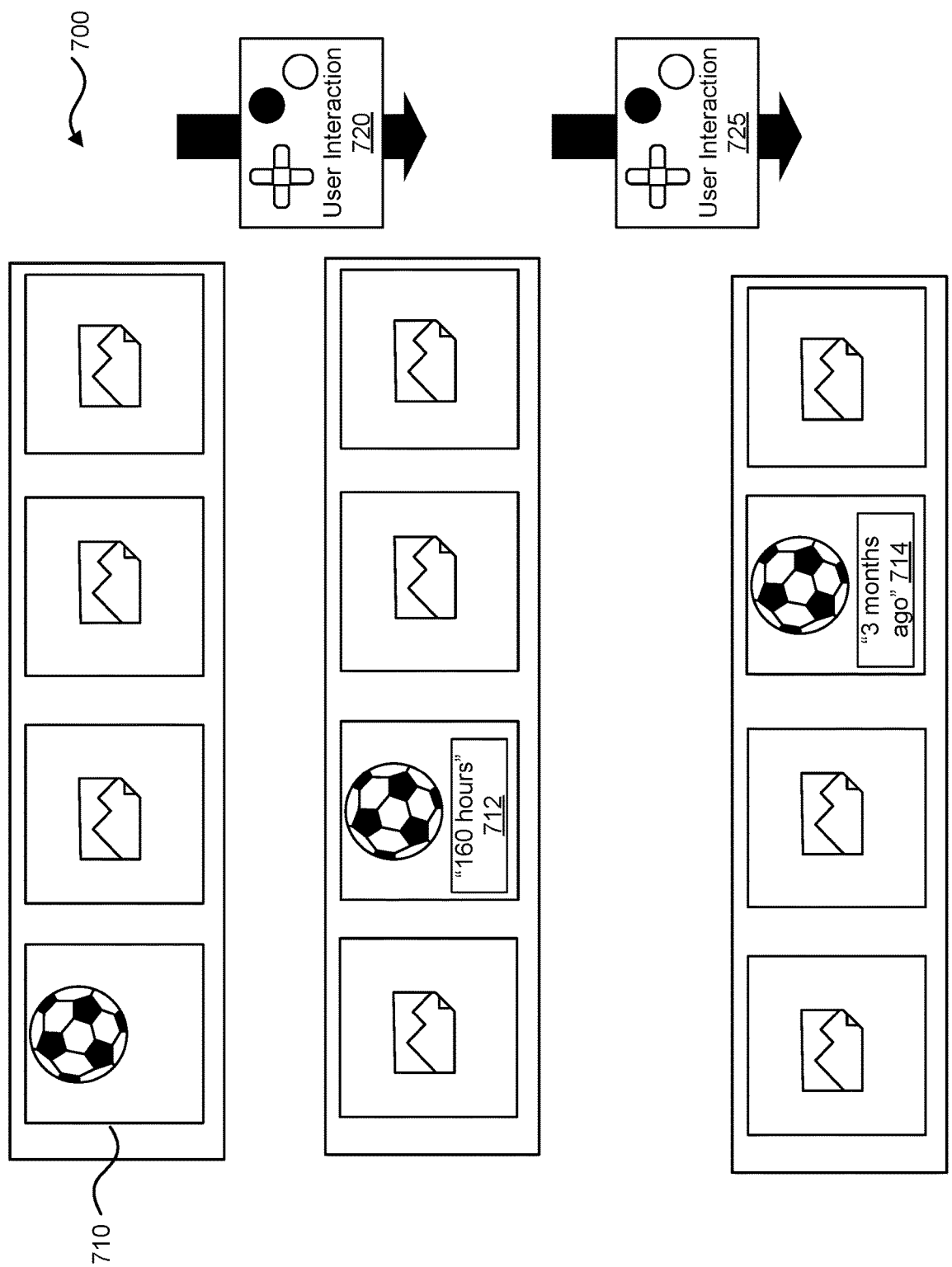
FIG. 7 illustrates an example of sorting tiles and presenting relevant sort information, according to an embodiment of the present disclosure.

FIG. 7 illustrates an example of sorting 700 tiles and presenting relevant sort information, according to an embodiment of the present disclosure. In particular, the tiles are arranged in a particular arrangement initially based on a default. Following any request to sort the tiles, the tiles are re-arranged and information relevant to the sorting 700 is presented, whereas other information that is irrelevant or that may be less relevant to the sorting 700 is not presented.

In an example, upon a user login to a video game console and a request for a library, a number of tiles are presented in the particular, initial arrangement (FIG. 7 shows five tiles arranged horizontally, although a different arrangement and number of tiles is possible as described in connection with FIGS. 2-3). A tile 710 is shown first (e.g., to the left) in this arrangement and corresponds to a particular video game concept (e.g., one for a sports video game title). The order of the tiles is based on an execution of a sort logic that applies a set of default sort factors, when no user interaction with the library has been received yet since the user login.

Next, a user interaction 720 with the library is received (e.g., with a control icon, similar to the control icon 234) and indicates a request to sort the tiles. The request can include a particular sort factor (e.g., this sort factor can be selected via the control icon). In an example, the sort factor is one of the attributes associated with the tiles (e.g., a primary attribute or a secondary attribute). Of course the value of the attributes changes dependently on the tile (e.g., the request can be for sorting video game applications based on "hours of play time," where the "hours of play time" is the sort attribute and the actual value of these hours changes depending on each one of the video game applications).

The different tiles are sorted according to the request and presented in a new arrangement. For instance, the tile 710 is re-arranged to be shown as the second tile. In addition, each one of the tiles in the new arrangement shows the corresponding value for the sort attribute. Each value can be shown in a container presented over the corresponding tile (as shown in FIG. 7 with element number 712; additionally or alternatively, each value can be shown within a predefined distance away from the corresponding tile (this distance can be defined as a number of pixels)). For instance, the tile 710 shows that the sports video game title has been played for one-hundred sixty hours. Other attributes that were not used in the sorting are not shows (e.g., their values not displayed) in association with the tiles.

Subsequently, another user interaction 725 with the library is received and indicates another request to sort the tiles. This request can include a different sort factor. In an example, this sort factor is also one of the attributes associated with the tiles. For instance, the request can be for sorting video game applications based on when the video game applications became available on the video console to the user account under which the user login was performed.

The different tiles are sorted again and presented in a new arrangement. For instance, the tile 710 is re-arranged to be shown as the third tile. In addition, each one of the tiles in the new arrangement shows the corresponding value for the different sort attribute (as shown in FIG. 7 with element number 714), no longer shows the corresponding value for the previously request sort attribute, and continues not showing other attributes that were not used in the new sorting. For instance, the tile 710 shows that the sports video game title became available three months ago.

Hence, and as illustrated in the above example illustration, tiles can be sorted in different arrangements based on attributes of the corresponding video game applications (or video game application variations). In each one of the arrangements, the value(s) of the attribute(s)) used in the sorting are shown whereas the value(s) of the remaining attribute(s) are filtered out and not shown.

Figure 8:
FIG. 8 illustrates examples of sort factors, according to embodiments of the present disclosure.

FIG. 8 illustrates examples of sort factors 800, according to embodiments of the present disclosure. A subset of the sort factors 800 is used by default to present an initial arrangement of tiles in a library. These and other sort factors 800 are also user selectable to allow additional sorting and updated arrangements. Generally, a sort factor can include an attribute of video game applications. Upon using this sort factor to generate an updated arrangement, the attribute (e.g., its corresponding value) is shown within or in proximity of each of the tiles, while other non-used attributes of the video game applications in the sorting are not shown.

Upon a user login to a video game console and to present the library for the first time after the user login, a default sort 810 is performed. This default sort 810 uses any or a combination of (i) a newness attribute, (ii) an update attribute, or (iii) a recency attribute.

For each of the video game application (or a variation indicated in a tile corresponding to the video game concept of that video game application), the newness attribute indicates how new the video game application is. That is the video game application is considered to be new when it has being acquired but not executed within a predefined time period from acquisition (e.g., acquired two weeks ago but not executed yet). The value of the newness attribute can change per video game application (or indicated variation thereof) depending on the corresponding acquisition date. The different tiles can be sorted in a descending order based on the newness attribute, whereby this order depends on the acquisition date (e.g., a first tile for a first "new" video game application acquired more recently than a second "new" video game application is sorted first relative to a second tile for the second "new" video game application).

Also for each of the video game application (or a variation indicated in a tile corresponding to the video game concept of that video game application), the update attribute indicates how an update to the video game application (or indicated variation thereof) since its last execution. That is the video game application is considered to be updated when it was already installed and a new software update or video content (e.g., video game level) was downloaded thereto and no user interaction with the update (e.g., playing the new video game level) has been received within a predefined time period from acquisition (e.g., acquired two weeks ago but not executed yet). The value of the update attribute can change per video game application (or indicated variation thereof) depending on the corresponding update date. The different tiles can be sorted in a descending order based on the update attribute, whereby this order depends on the update date (e.g., a first tile for a first "updated" video game application updated more recently than a second "updated" video game application is sorted first relative to a second tile for the second "updated" video game application).

Likewise, for each of the video game application (or a variation indicated in a tile corresponding to the video game concept of that video game application), the recency attribute indicates how recently a user (e.g., the video game player corresponding to the user login) interacted with the video game application (or the variation indicated thereof). For instance, the recency attribute can be any of a last execution date of the video game application (or the indicated variation thereof), an acquisition date of the video game application (or the variation indicated thereof), or an availability date of when the video game application (or indicated variation thereof) became available on the video game console to a user identifier (e.g., the user name or user account used for the login). The last execution date, the acquisition date, and the availability date can be referred to as a recency date. Here also, the value of the recency attribute can change per video game application (or indicated variation thereof) depending on the corresponding recency date. The different tiles can be sorted in a descending order based on the recency attribute, whereby this order depends on the recency date (e.g., a first tile for a first video game application with which the user more recently interacted than a second video game application is sorted first relative to a second tile for the second video game application).

In an example, the default sort 810 arranges the tiles according all three attributes. For instance, the tiles are arranged according to the newness attribute first, the update attribute next, and the recency attribute last. In particular, a first tile for a first "new" video game application is sorted first relative to a second tile for a second "updated" video game application even when the newness date falls after the update date. Similarly, the second tile is sorted ahead of a third tile for a third video game application with which the user recently interacted even when the update date falls after the recency date.

Once the library is presented in an initial arrangement according to the default sort 810, any of the newness, update, and recency attributes remain available and can be selected for subsequent sorting. Other attributes also become available, including a file size attribute for a file size sort 820, an alphabetical attribute for an alphabetical sort 830, a number of hours of play time for an hours played sort 840, and a purchase date attribute and an available date attribute for a purchased date sort 850.

The file size sort 820 arranges the tiles based on the file sizes of the corresponding video game applications (or indicated variations thereof). For each of the video game application (or indicated variation thereof), the file size attribute indicates the file size of the underlying program code as stored in memory (internal or external) of the video game console. In an example, a descending order is used, whereby a first tile for a first video game application than has a larger size than that of a second video game application is sorted first relative to a second tile for the second video game application.

The alphabetical sort 830 arranges the tiles based on the title of the corresponding video game applications (or indicated variations thereof). Each of the video game application (or indicated variation thereof) has a title, and the letters of the title can be used as an alphabetical attribute in the alphabetical sort 830. This sort 830 can be ascending or descending.

The hours played sort 840 arranges the tiles based on the numbers of hours of play time of the corresponding video game applications (or indicated variations thereof). For each of the video game application (or indicated variation thereof), the video game console (or a remote server associated with the video game console and the user identifier) tracks the number of hours played in association with the user identifier. The value of the number of hours of play time corresponding to the tracked number of hours. The different tiles can be sorted in a descending order based on the corresponding values, (e.g., a first tile for a first video game application updated played more, in terms of hours, than a second video game application is sorted first relative to a second tile for the second video game application).

The purchased date sort 850 arranges the tiles based on the purchase dates (e.g., acquisition dates) of the video game applications (or the variations indicated thereof) or the availability dates of when the video game applications (or indicated variations thereof) became available on the video game console. The different tiles can be sorted in a descending order based on the corresponding purchase dates or availability dates (e.g., a first tile for a first video game application having a more recent purchase date than a second video game application is sorted first relative to a second tile for the second video game application).

Additional attributes can also be available for sorting the tiles. For each of the video game application (or indicated variation thereof), these attributes relate to its compatibility with one or more video game platform generations and to the version type of the video game application (or indicated variation thereof). The compatibility attributes enable a generation sort 860. Version attribute enable a version sort 870.

In an example, the generation sort 860 arranges the tiles based on the compatibility of the video game applications (or the variations indicated thereof) with the video game platform generations. The different tiles can be sorted in a descending order of compatibility, where video game applications (or indicated variations thereof) that are compatible with the newest video game platform generation are sorted ahead of those compatible with the previous video game platform generation, and so on and so forth.

The version sort arranges the tiles based on the versions of the video game applications (or the variations indicated thereof) with the video game platform generations. The different tiles can be sorted in a descending order of version, where the ones for beta versions are sorted ahead of the ones for trial versions that, in turn, are sorted ahead of demo versions that, in turn, are sorted ahead of full release versions.

Figure 9:
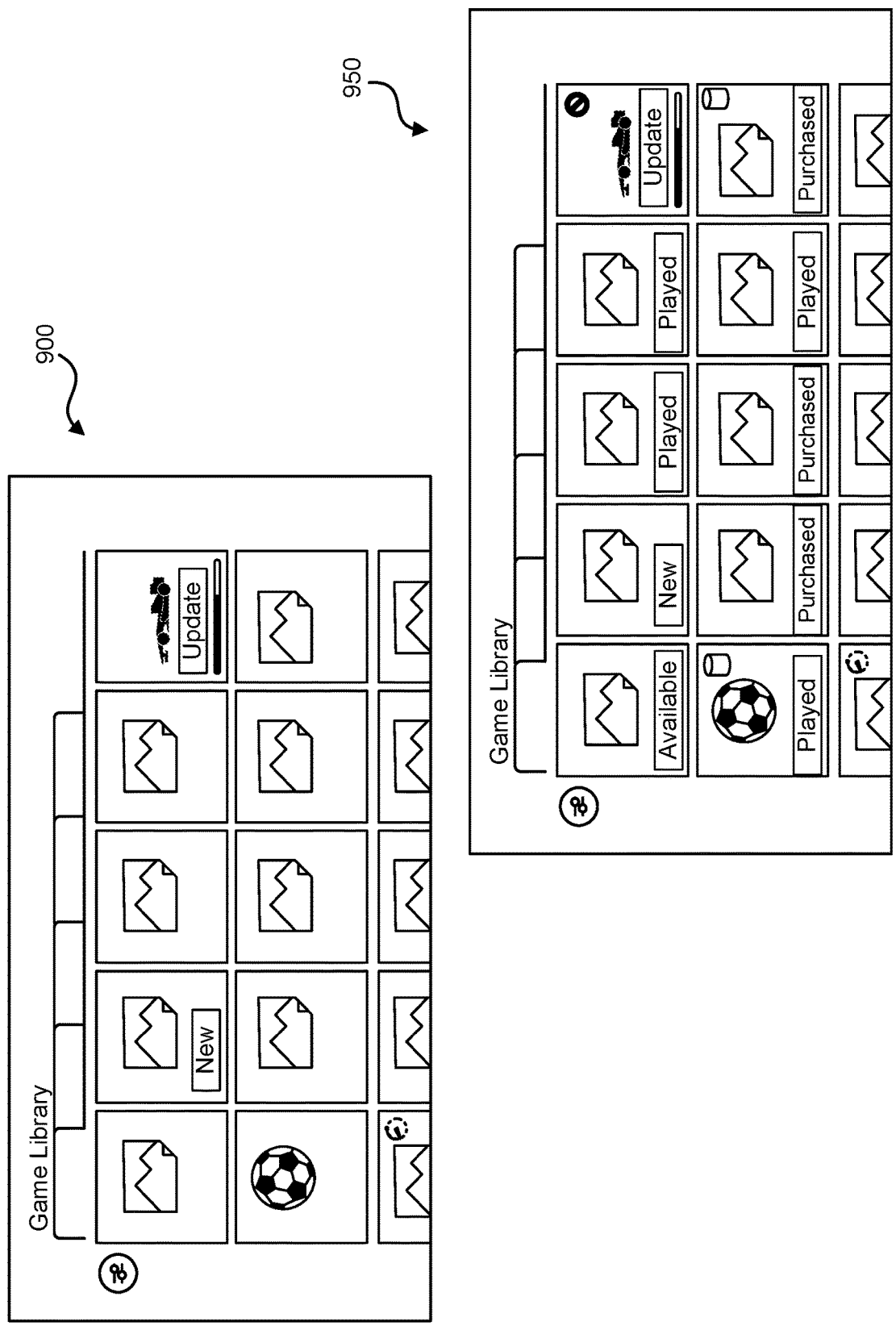
FIG. 9 illustrates an example of an arrangement of tiles according to a default sort and a presentation of the arrangement according to different presentation states, according to embodiments of the present disclosure.

FIG. 9 illustrates an example of an arrangement of tiles according to a default sort and a presentation of the arrangement according to different presentation states, according to embodiments of the present disclosure. In particular, a library shows a grid of tiles, each of which corresponds to a video game application or a variation thereof. The tiles are organized in a the arrangement according to the default sort. This default sort uses one or more of a newness attribute, update attribute, or recency attribute.

The arrangement is presented in a glanced state 900. Because the glanced state 900 provides a reduced or minimum amount of information, the sort attribute(s) used in the default sort may not be shown within the tiles or in proximity to the tiles (e.g., at predefined distances thereto).

Upon a request for a focused state 950, the arrangement is presented in the focused state 950. The arrangement itself does not change (e.g., the order of the tiles remains the same). However, because the focused state 950 provides additional information, additional attributes and indicators are shown within the tiles (or, in other examples, in proximity to the tiles). The shown attributes can, but need not, include the sort attribute(s).

Figure 10:
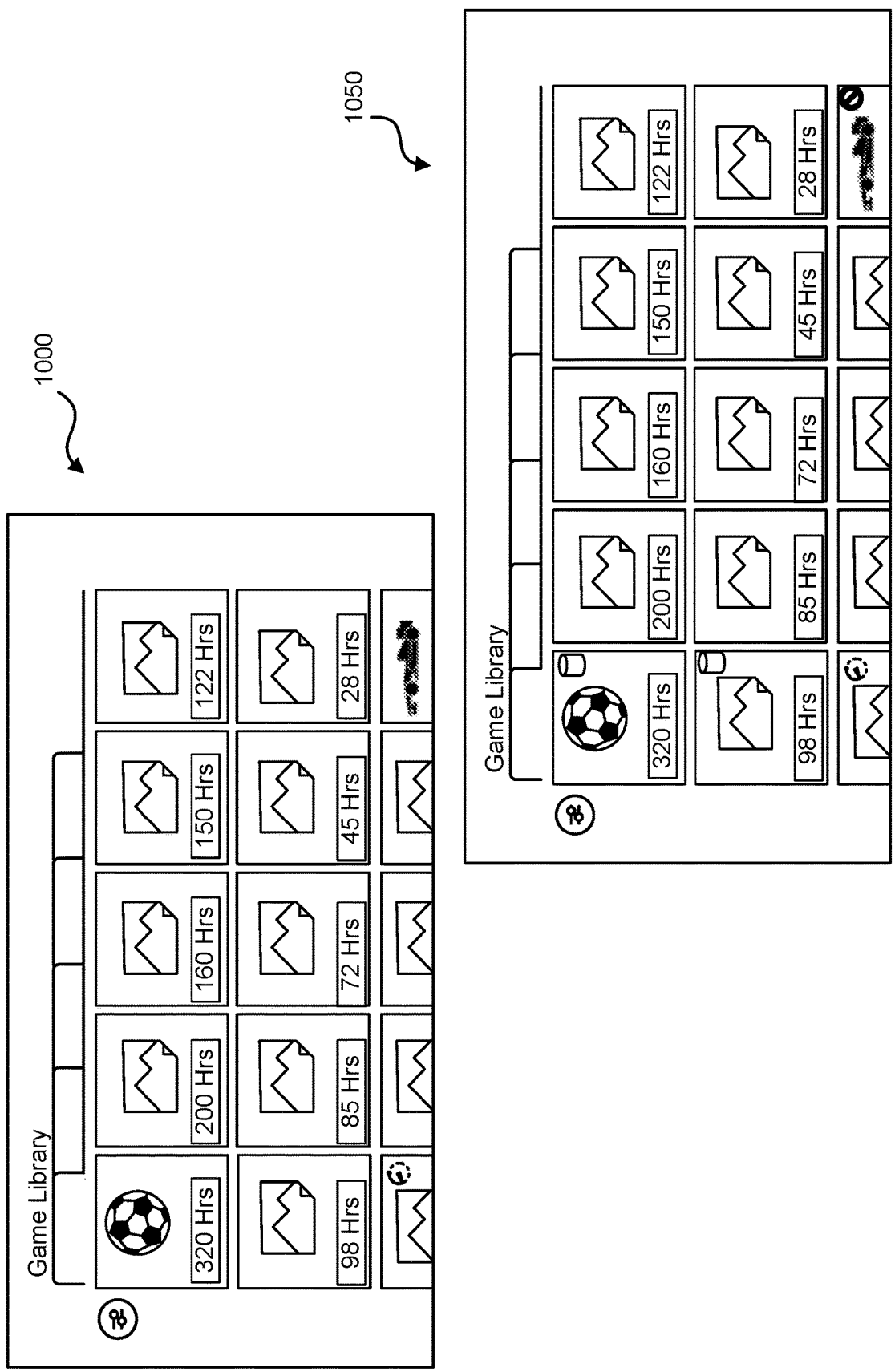
FIG. 10 illustrates an example of an arrangement of tiles according to a user-selected sort factor and a presentation of the arrangement according to different presentation states, according to embodiments of the present disclosure.

FIG. 10 illustrates an example of an arrangement of tiles according to a user-selected sort factor and a presentation of the arrangement according to different presentation states, according to embodiments of the present disclosure. Referring back to FIG. 9, the same tiles are shown in the library but in a new arrangement within the grid given the user-selected sort factor. The user-selected sort factor is a number of hours of play time attribute ad is used herein for illustrative purposes. Of course, as discussed in FIG. 8, other factors can be selected and used in the sorting.

The arrangement is presented in a glanced state 1000. Although the glanced state 1000 provides a reduced or minimum amount of information, the sort attribute(s) used in the sorting (e.g. the number of hours of play time attribute) are shown within the tiles (or, in other examples, in proximity to the tiles). That is because the sort attribute(s) were selected by the user and are considered as relevant information that should be presented to the user. Hence, the value of the sort attribute(s) (e.g., the actual played hours per video game application or indicated variation thereof) is added to the reduced or minimum information and is presented in the glanced state 1000.

Upon a request for a focused state 1050, the arrangement is presented in the focused state 1050. The arrangement itself does not change (e.g., the order of the tiles remains the same). However, because the focused state 1050 provides additional information, additional attributes and indicators are shown within the tiles (or, in other examples, in proximity to the tiles). Because of the relevance of the sort attribute(s), the sort attribute(s) remain presented within tiles in the focused state 1050.

Figure 11:
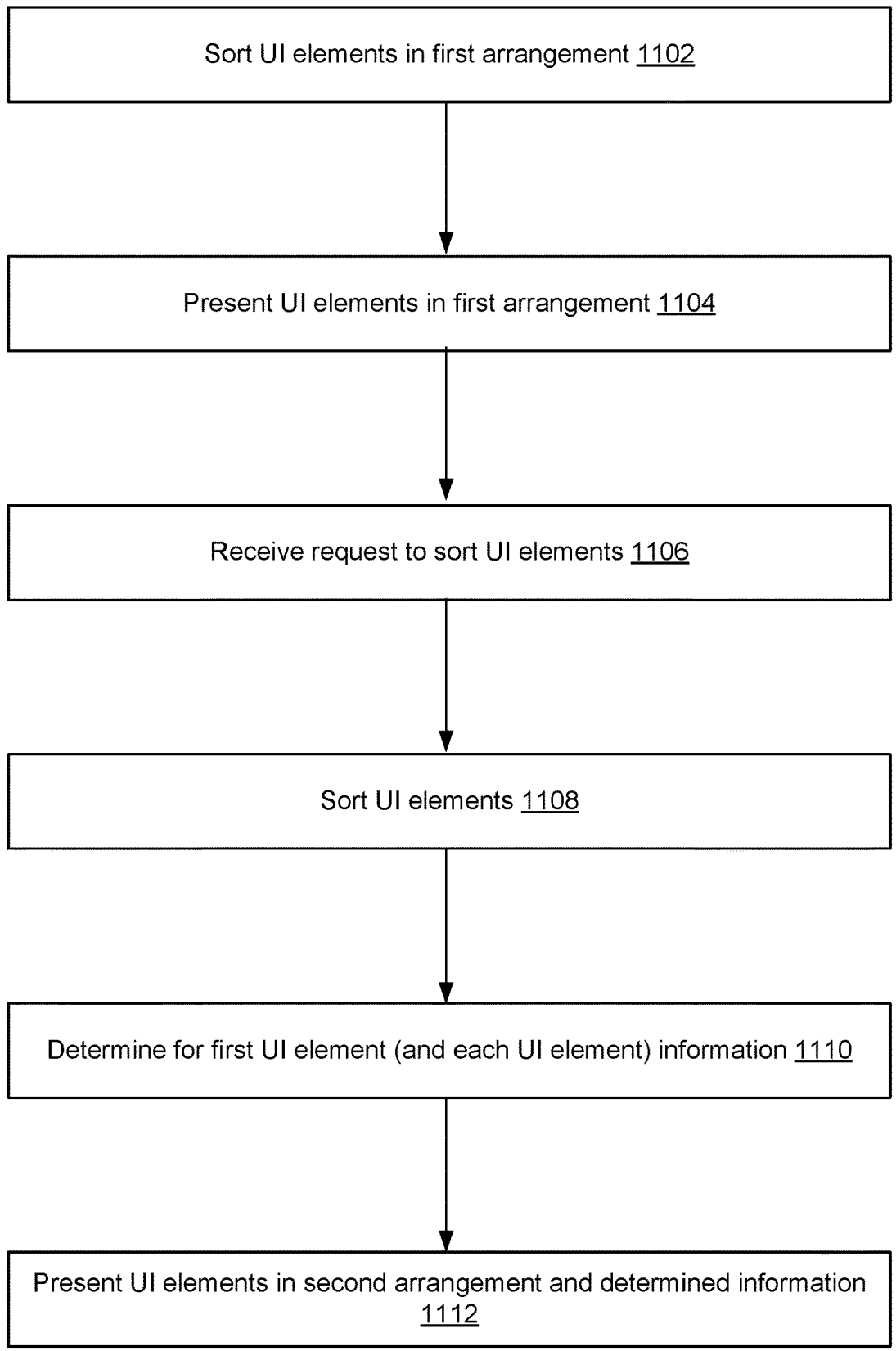
FIG. 11 illustrates an example of a flow for sorting and presenting UI elements on a GUI, according to embodiments of the present disclosure.
Figure 12:
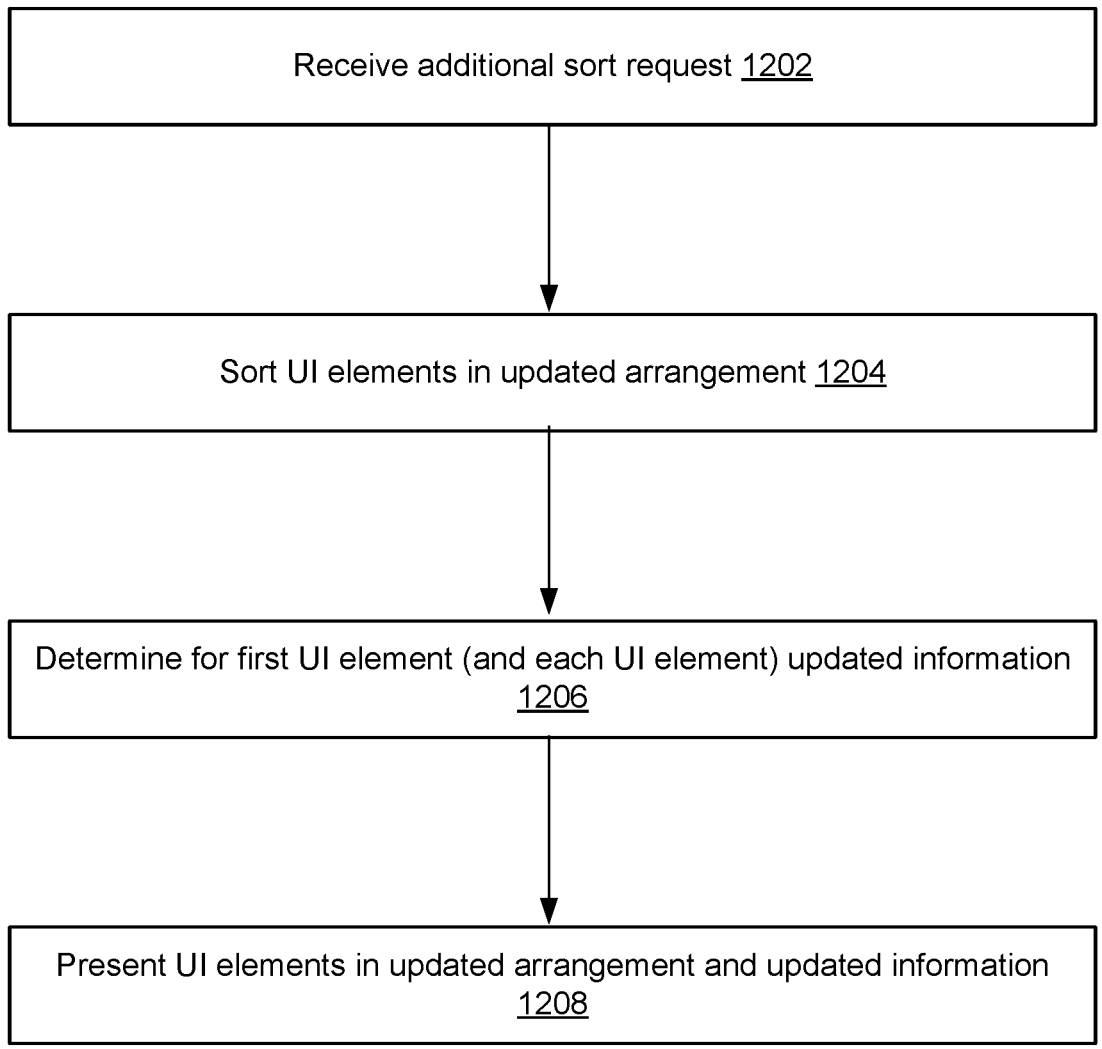
FIG. 12 illustrates an example of a flow for updating a presentation of UI elements based on an additional sort request, according to embodiments of the present disclosure.
Figure 13:
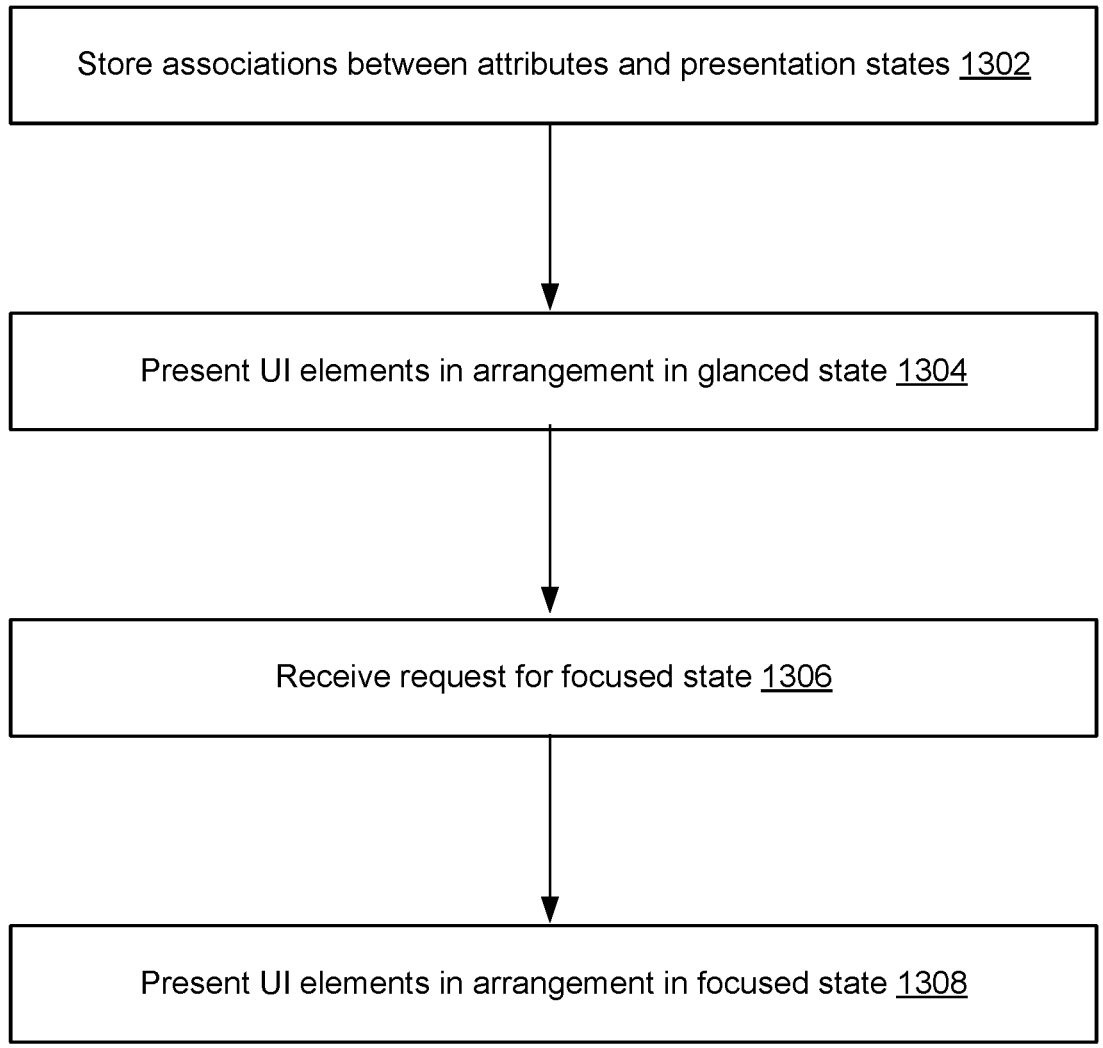
FIG. 13 illustrates an example of presenting attributes in association with sorted UI elements based on a presentation state, according to embodiments of the present disclosure.

FIGS. 11-13 illustrates example flows for presenting UI elements and information relevant to sorting of these UI elements. The operations of the flow can be implemented as hardware circuitry and/or stored as computer-readable instructions on a non-transitory computer-readable medium of a computer system, such as the video game console 110 of FIG. 1. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

FIG. 11 illustrates an example of a flow for sorting and presenting UI elements on a GUI, according to embodiments of the present disclosure. As illustrated, the flow starts at operations 1102, where the computer system sorts UI elements to generate a first arrangement for presenting the UI elements on the GUI. For instance, the UI elements are tiles. A tile can correspond to a set of video game applications (e.g., a video game application or a media application, a variation thereof grouped in a concept, or the concept that groups multiple of such variations). Additionally or alternatively, a tile can correspond to a set of computer files (e.g., a computer file, a variation thereof grouped in a concept, or the concept that groups multiple of such variations). Each of the tiles can be selected to launch the corresponding video game application, media application, computer file, or variation thereof or a page about the corresponding video game application, media application, computer file, or variation thereof. In addition, each of the tiles can be associated with attributes of the launch the corresponding video game application, media application, computer file, or variation. The sorting of the UI elements (e.g., the tiles) uses a default sort that arranges the UI tiles based on any or a combination of a newness attribute, update attribute, or recency attribute.

At operation 1104, the computer system presents the first UI elements in the first arrangement. For instance, the tiles are presented in a grid arrangement initially according to a glanced state and, upon request, according to a focused state. The attribute(s) used in the default sort may not be presented in the grid arrangement.

At operation 1106, the computer system receives a request to sort the UI elements. In an example, the request includes a selection of one or more of the attributes associated with the tiles for the sorting.

At operation 1108, the computer system sorts the UI elements based on the request to generate a second arrangement. In an example, a selected attribute can correspond to a newness attribute, an update attribute, a recency attribute, a file size attribute, an alphabetical attribute, a number of hours of play time attribute, a purchase date attribute, and available date attribute, a generation attribute, or a version attribute. Depending on the selected attribute, the computer system uses a sort logic corresponding to the default sort, file size sort, alphabetical sort, hours played sort, purchased date sort, generation sort, or version sort to re-order the tiles in an ascending or descending order, and the resulting sort order corresponds the second arrangement.

At operation 1110, the computer system determines for a first UI element information to present in the second arrangement on the GUI in association with this first UI element. In an example, the information relevant to the sort is determined. Additional information irrelevant to the sort can be filtered out. For instance, a selected sort attribute is determined to be relevant and its value associated with the tile (e.g., the first UI element) is included in the information to be presented. An attribute that is associated with the tile but that was not used in the sorting is determined to be irrelevant and its value is excluded from the information to be presented. Of course, this information determination operation is repeated for the various UI elements that are to be presented in the second arrangement.

At operation 1112, the computer system presents the UI elements in the second arrangement and the information determined to be relevant for each UI element. For instance, the tiles are re-ordered in the grid arrangement according to the sort order determined at operation 1108. In addition, for each tile (e.g., the first UI element), the information determined to be relevant (e.g., the value of the selected attribute) is presented within each tile or in proximity to the tile. Additional information determined to be irrelevant (e.g., the value of another attribute that was not selected for the sorting) is filtered out and may not be presented. In particular, the second arrangement is presented initially in the glanced state, showing the tiles and the relevant information (e.g., any of the selected attributes for the sorting). Upon a user request, the second arrangement is presented in the focused state, still showing the tiles and the relevant information and, optionally, showing additional information (e.g., some of the attributes that were not selected for the sorting) based on associations between the attributes and the focused state.

FIG. 12 illustrates an example of a flow for updating a presentation of UI elements based on an additional sort request, according to embodiments of the present disclosure. Here, and the interest of clarity of explanation, the flow is described as a continuation of the flow of FIG. 11, where an additional sort request is received and processed.

As illustrated, the flow of FIG. 12 starts at operation 1202, where the computer system receives the additional sort request. In an example, this sort request includes a selection of at least one different attributes for an updated sorting (e.g., an attribute that was not selected for the previous sorting). Here also, a different attribute can be any of a newness attribute, an update attribute, a recency attribute, a file size attribute, an alphabetical attribute, a number of hours of play time attribute, a purchase date attribute, and available date attribute, a generation attribute, or a version attribute.

At operation 1204, the computer system sort the UI elements to generate an updated arrangement. Similarly to operation 1108, depending on each attribute selected in the additional sort request, the computer system uses a sort logic corresponding to the default sort, file size sort, alphabetical sort, hours played sort, purchased date sort, generation sort, or version sort to re-order the tiles in an ascending or descending order, and the resulting sort order corresponds the updated arrangement.

At operation 1206, the computer system determines for the first UI element information to present in the updated arrangement on the GUI in association with this first UI element. This operation is similar to operation 1110, except that an attribute selected in the additional sort request is considered to be relevant information and an attribute that was selected in the previous sort request and is no longer selected in this additional sort request is no longer to be considered relevant. accordingly, the information to be shown in the tile (e.g., the first UI element) on in proximity thereto can dynamically change with the sort requests. Information that was relevant and no longer is (e.g., an attribute previously selected for the previous sort and no longer selected for the additional sort) can be filtered out and removed from presentation. Information that was not relevant and became relevant (e.g., an attribute not previously selected for the previous sort and currently selected for the additional sort) is added to the presentation. Of course, this information determination operation is repeated for the various UI elements that are to be presented in the second arrangement.

At operation 1208, the computer system presents the UI elements in the UI elements in the information arrangement and the updated information determined to be relevant for each UI element. For instance, the tiles are re-ordered in the grid arrangement according to the sort order determined at operation 1204. In addition, for each tile (e.g., the first UI element), the information determined to be relevant (e.g., the value of a selected attribute in the additional sort request) is presented within each tile or in proximity to the tile. Additional information determined to be irrelevant (e.g., the value of another attribute that was not previously selected and is no longer selected for the sorting) is filtered out and may not be presented. In particular, the updated arrangement is presented initially in the glanced state, showing the tiles and the relevant information. Upon a user request, the updated arrangement is presented in the focused state, still showing the tiles and the relevant information and, optionally, showing additional information (e.g., some of the attributes that were not selected for the current sorting) based on associations between the attributes and the focused state.

FIG. 13 illustrates an example of presenting attributes in association with sorted UI elements based on a presentation state, according to embodiments of the present disclosure. The presentation state can be a glanced state or a focused state.

As illustrated, the flow of FIG. 13 starts at operation 1302, where the computer system stores associates between attributes and presentation states. For instance, the attributes include of a newness attribute, an update attribute, a recency attribute, a file size attribute, an alphabetical attribute, a number of hours of play time attribute, a purchase date attribute, and available date attribute, a generation attribute, and a version attribute. For each of the attributes, the computer system stores, in a data structure, an indication of whether the attribute is associated with the glanced state and/or focused state. For instance, the data structure can be a table, with each one of the attributes as a row entry, with the glanced state as a column entry, and with the focused state as another column entry. In a cell entry of the table (e.g., intersection between an attribute's row entry and one of the presentation states' column entries), an indication (e.g., a value of one) is added to indicate that this attribute is associated with the presentation state.

At operation 1304, the computer system presents UI elements in an arrangement in the glanced state. In an example, the arrangement is presented in a library of tiles and the library is shown according to the glanced state. Generally, because the glanced state provides the minimum or a reduced number of information, an attribute associated with the glanced state may be presented only if the attribute was used for the sorting that resulted in the arrangement.

At operation 1306, the computer system receives a request for the focused state. For instance, this request is received from an input device communicatively coupled with the computer system based on user input at the input device.

At operation 1308, the computer system presents the UI elements in the arrangement in the focused state. In an example, the arrangement remains the same. However, additional information is presented. For instance, for each of the tiles in the library, the computer system shows at least one of the attributes associated with the focused state. This attribute can be shown in addition to any other attribute that is shown and that was used for the sorting that resulted in the arrangement.

Figure 14:
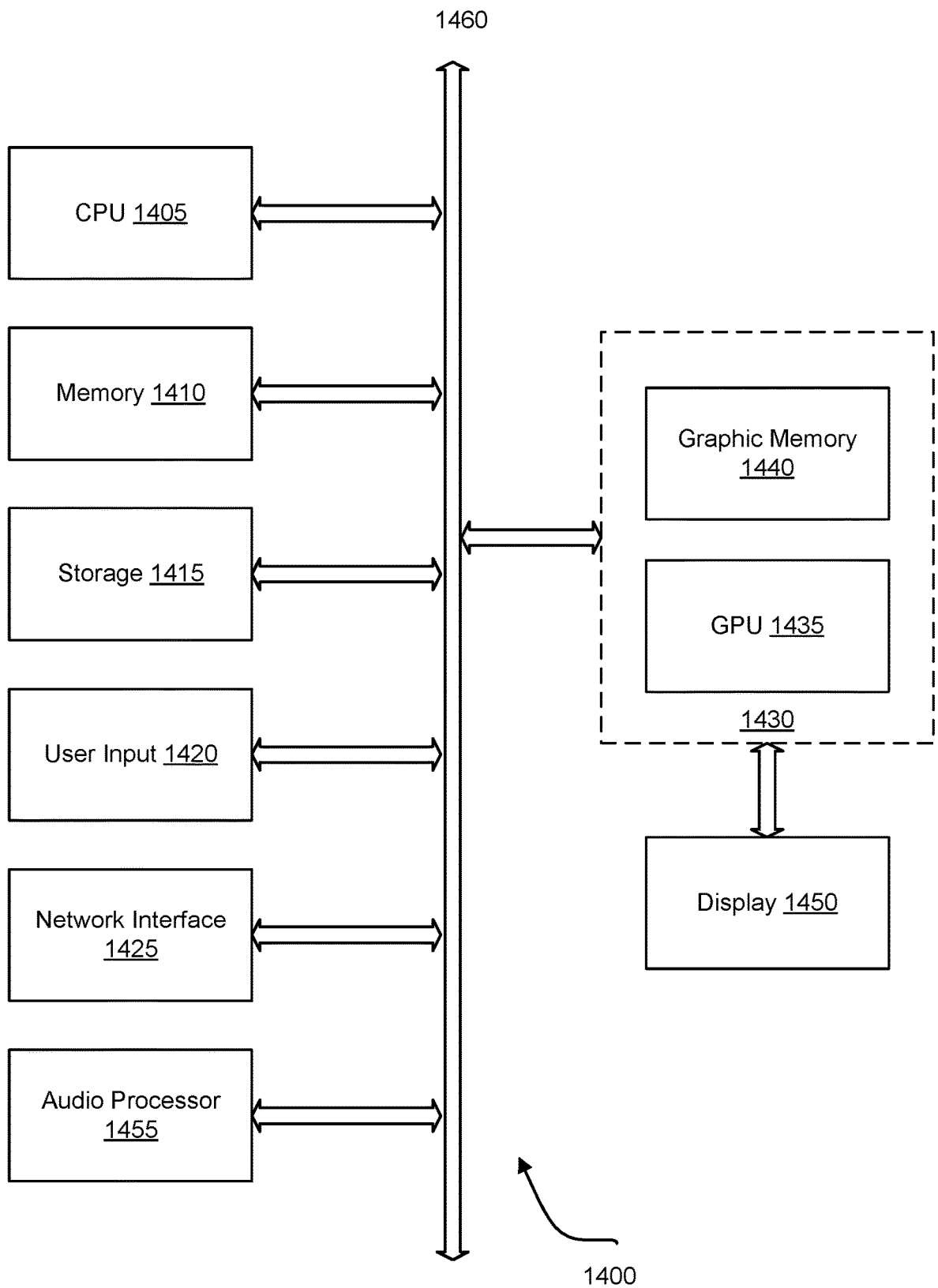
FIG. 14 illustrates an example of a hardware system suitable for implementing a computer system, according to embodiments of the present disclosure.

FIG. 14 illustrates an example of a hardware system suitable for implementing a computer system, according to embodiments of the present disclosure. The computer system 1400 represents, for example, a video game system, a backend set of servers, or other types of a computer system. The computer system 1400 includes a central processing unit (CPU) 1405 for running software applications and optionally an operating system. The CPU 1405 may be made up of one or more homogeneous or heterogeneous processing cores. Memory 1410 stores applications and data for use by the CPU 1405. Storage 1415 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1420 communicate user inputs from one or more users to the computer system 1400, examples of which may include keyboards, mice, joysticks, touch pads, touch screens, still or video cameras, and/or microphones. Network interface 1425 allows the computer system 1400 to communicate with other computer systems via an electronic communications network, and may include wired or wireless communication over local area networks and wide area networks such as the Internet. An audio processor 1455 is adapted to generate analog or digital audio output from instructions and/or data provided by the CPU 1405, memory 1410, and/or storage 1415. The components of computer system 1400, including the CPU 1405, memory 1410, data storage 1415, user input devices 1420, network interface 1425, and audio processor 1455 are connected via one or more data buses 1460.

A graphics subsystem 1430 is further connected with the data bus 1460 and the components of the computer system 1400. The graphics subsystem 1430 includes a graphics processing unit (GPU) 1435 and graphics memory 1440. The graphics memory 1440 includes a display memory (e.g., a frame buffer) used for storing pixel data for each pixel of an output image. The graphics memory 1440 can be integrated in the same device as the GPU 1435, connected as a separate device with the GPU 1435, and/or implemented within the memory 1410. Pixel data can be provided to the graphics memory 1440 directly from the CPU 1405. Alternatively, the CPU 1405 provides the GPU 1435 with data and/or instructions defining the desired output images, from which the GPU 1435 generates the pixel data of one or more output images. The data and/or instructions defining the desired output images can be stored in the memory 1410 and/or graphics memory 1440. In an embodiment, the GPU 1435 includes 3D rendering capabilities for generating pixel data for output images from instructions and data defining the geometry, lighting, shading, texturing, motion, and/or camera parameters for a scene. The GPU 1435 can further include one or more programmable execution units capable of executing shader programs.

The graphics subsystem 1430 periodically outputs pixel data for an image from the graphics memory 1440 to be displayed on the display device 1450. The display device 1450 can be any device capable of displaying visual information in response to a signal from the computer system 1400, including CRT, LCD, plasma, and OLED displays. The computer system 1400 can provide the display device 1450 with an analog or digital signal.

In accordance with various embodiments, the CPU 1405 is one or more general-purpose microprocessors having one or more processing cores. Further embodiments can be implemented using one or more CPUs 1405 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 76%, 135%, 90%, 100%, 105%, 109%, 109.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for sorting elements on a user interface, the method implemented on a computer device and comprising:
   presenting, on the user interface, user interface (UI) elements in a first arrangement, wherein a first UI element of the UI elements (i) corresponds to a set of computer applications or computer files, (ii) is associated with a plurality of attributes about the set, and (iii) is configured to, upon selection via the user interface, launch a computer application or a computer file of the set, or a page about the set;
   receiving a request to sort the UI elements on the user interface, the request comprising a selection of a first attribute of the plurality of attributes;
   sorting the UI elements based on the first attribute to generate a second arrangement of the UI elements;
   determining, for the first UI element, information about the set, the information comprising a value of the first attribute and excluding a second attribute of the plurality of attributes; and
   presenting, on the user interface and in response to the request, the UI elements in the second arrangement and the information determined for first UI element.

2. The method of claim 1, wherein the information determined for the first UI element excludes remaining attributes of the plurality of attributes.

3. The method of claim 2, wherein presenting the information comprises presenting the value in the first UI element and excluding a presentation of the remaining attributes in the first UI element.

4. The method of claim 2, wherein presenting the information comprises presenting the value within a predefined distance from the first UI element and excluding a presentation of the remaining attributes.

5. The method of claim 1, further comprising:
   prior to presenting the UI elements in the first arrangement, sorting the UI elements based on a default subset of the plurality of attributes to generate the first arrangement, wherein the default subset comprises (i) a newness attribute about a computer application being acquired but not executed within a predefined time period from acquisition, and (ii) an update attribute about an update to the computer application since a last execution of the computer application.

6. The method of claim 5, wherein the default subset further comprises a recency attribute about at least one of (iii) a last execution date of the computer application, (iv) an acquisition date of the computer application, or (v) an availability date of when the computer application became available on the computer device to a user identifier.

7. The method of claim 6, wherein the UI elements are sorted based on the default subset by arranging the UI elements according to the newness attribute first, the update attribute next, and the recency attribute last.

8. The method of claim 1, further comprising:
   receiving a second request to sort the UI elements on the user interface, the second request comprising a selection of the second attribute;
   sorting the UI elements based on the second attribute to generate a third arrangement of the UI elements;
   determining, for the first UI element, second information about the set, the second information comprising the second attribute and excluding the first attribute; and
   presenting, on the user interface and in response to the second request, the UI elements in the third arrangement and the second information determined for first UI element.

9. The method of claim 8, wherein:
   prior to receiving the second request, the first attribute is presented in the first UI element or within a predefined distance from the first UI element, and
   after receiving the second request, the first attribute is no longer presented and the second attribute is presented in the first UI element or within the predefined distance from the first UI element.

10. The method of claim 1, wherein each of the first arrangement and the second arrangement corresponds to a non-focused presentation state, and the method further comprising:
    receiving a request to present the UI elements in a focused presentation state; and
    presenting, in the focused presentation state, the UI elements in the second arrangement, the information determined for the first UI element, and additional information determined for the first UI element, the additional information comprising the second attribute.

11. The method of claim 10, further comprising:
    storing a first association between a first subset of the plurality of attributes and the non-focused presentation state and a second association between a second subset of the plurality of attributes and the focused presentation state.

12. The method of claim 11, wherein:
    in the non-focused presentation state, the UI elements are presented in the first arrangement based on the first association,
    in the non-focused presentation state, the UI elements are presented in the second arrangement based on the first association and by limiting the information to the first attribute, and
    in the focused presentation state, the UI elements are presented in the second arrangement based on the second association.

13. The method of claim 1, wherein the first UI element corresponds to a first computer application, and wherein the first attribute comprises: a last execution date of the first computer application on the computer device, an availability date of when the first computer application became available on the computer device to a user identifier, or a length of time the first computer application was executed in association with the user identifier.

14. The method of claim 1, wherein the first UI element corresponds to a first computer application, and wherein the first attribute comprises: a version of the first computer application, or a compatible version of the computer device to run first computer application.

15. The method of claim 1, wherein the first UI element is an icon corresponding to an application group that includes computer applications, wherein the computer applications of the application group are different variations of a same computer program.

16. The method of claim 15, wherein the computer program is a video game title, wherein the computer applications of the application group are video game variations, and wherein the icon comprises content common to the video game variations and identifies one of the video game variations.

17. A computer device comprising:
one or more processors; and
one or more memories storing computer-readable instructions that, upon execution by the one or more processors, configure the computer device to:
  present, on a user interface, user interface (UI) elements in a first arrangement, wherein a first UI element of the UI elements (i) corresponds to a set of computer applications or computer files, (ii) is associated with a plurality of attributes about the set, and (iii) is configured to, upon selection via the user interface, launch a computer application or a computer file of the set, or a page about the set;
  receive a request to sort the UI elements on the user interface, the request comprising a selection of a first attribute of the plurality of attributes;
  sort the UI elements based on the first attribute to generate a second arrangement of the UI elements;
  determine, for the first UI element, information about the set, the information comprising a value of the first attribute and excluding a second attribute of the plurality of attributes; and
  present, on the user interface and in response to the request, the UI elements in the second arrangement and the information determined for first UI element.

18. The computer device of claim 17, wherein the information determined for the first UI element excludes remaining attributes of the plurality of attributes, and wherein presenting the information comprises presenting the value in the first UI element or within a predefined distance from the first UI element and excluding a presentation of the remaining attributes.

19. A non-transitory computer-readable storage medium storing computer-readable instructions that, upon execution on a computer device, cause the computer device to perform operations comprising:
  presenting, on a user interface, user interface (UI) elements in a first arrangement, wherein a first UI element of the UI elements (i) corresponds to a set of computer applications or computer files, (ii) is associated with a plurality of attributes about the set, and (iii) is configured to, upon selection via the user interface, launch a computer application or a computer file of the set, or a page about the set;
  receiving a request to sort the UI elements on the user interface, the request comprising a selection of a first attribute of the plurality of attributes;
  sorting the UI elements based on the first attribute to generate a second arrangement of the UI elements;
  determining, for the first UI element, information about the set, the information comprising a value of the first attribute and excluding a second attribute of the plurality of attributes; and
  presenting, on the user interface and in response to the request, the UI elements in the second arrangement and the information determined for first UI element.

20. The non-transitory computer-readable storage medium of claim 19, wherein the operations further comprise:
  receiving a second request to sort the UI elements on the user interface, the second request comprising a selection of the second attribute;
  sorting the UI elements based on the second attribute to generate a third arrangement of the UI elements;
  determining, for the first UI element, second information about the set, the second information comprising the second attribute and excluding the first attribute; and
  presenting, on the user interface and in response to the second request, the UI elements in the third arrangement and the second information determined for first UI element.

* * * * *